United States Patent
Oosawa

(10) Patent No.: US 7,286,694 B2
(45) Date of Patent: Oct. 23, 2007

(54) METHOD AND APPARATUS FOR AIDING IMAGE INTERPRETATION AND COMPUTER-READABLE RECORDING MEDIUM STORING PROGRAM THEREFOR

(75) Inventor: Akira Oosawa, Kanagawa-ken (JP)

(73) Assignee: Fujifilm Corporation, Tokyo (JP)

( * ) Notice: Subject to any disclaimer, the term of this patent is extended or adjusted under 35 U.S.C. 154(b) by 671 days.

(21) Appl. No.: 10/860,564

(22) Filed: Jun. 4, 2004

(65) Prior Publication Data

US 2005/0025365 A1 Feb. 3, 2005

(30) Foreign Application Priority Data

Jun. 6, 2003 (JP) ............................. 2003-161916
May 28, 2004 (JP) ............................. 2004-158580

(51) Int. Cl.
*G06K 9/00* (2006.01)

(52) U.S. Cl. ..................... 382/128; 382/294; 378/20

(58) Field of Classification Search .............. 382/100, 382/128, 129, 130, 131–133, 154, 168, 169, 382/181, 224, 232, 255, 260, 274–276, 294–300; 348/91; 712/32; 358/1.13; 385/46; 378/2, 378/20; 356/73

See application file for complete search history.

(56) References Cited

U.S. PATENT DOCUMENTS

| | | | | |
|---|---|---|---|---|
| 5,144,421 A * | 9/1992 | Lemelson | ..................... | 348/91 |
| 5,487,172 A * | 1/1996 | Hyatt | ......................... | 712/32 |
| 5,623,528 A * | 4/1997 | Takeda | ......................... | 378/2 |
| 5,790,690 A * | 8/1998 | Doi et al. | ..................... | 382/128 |
| 6,122,042 A * | 9/2000 | Wunderman et al. | ......... | 356/73 |
| 6,169,840 B1 * | 1/2001 | Lemelson | ..................... | 386/46 |
| 7,221,464 B2 * | 5/2007 | Yamano | ..................... | 358/1.13 |
| 2001/0002934 A1 | 6/2001 | Oosawa | | |
| 2001/0048757 A1 | 12/2001 | Oosawa | | |

FOREIGN PATENT DOCUMENTS

JP 7-37074 A 2/1995

OTHER PUBLICATIONS

J. Liang, et al., "Dynamic chest image analysis: model-based ventilation study with pyramid images", Proceedings of SPIE Medical Imaging 1997: Physiology and Function from Multidimensional Images, SPIE, May 1997. vol. 3033. D81-92.*

(Continued)

*Primary Examiner*—Azarian Seyed
(74) *Attorney, Agent, or Firm*—Sughrue Mion, PLLC

(57) ABSTRACT

The same subject can be accurately aligned for effective interpretation of two observation images representing a change in the subject and not adjacent to each other in three or more images arranged in temporal order of the change. The subject in one of the observation images is aligned to the subject in a transitional image adjacent to the observation image, and an aligned image is generated. The same procedure is repeated between the previous aligned image and a transitional image adjacent to the previous transitional image to generate another aligned image. A final aligned image is generated by aligning the subject in the observation image to the subject in a reference image. This procedure is carried out for the other observation image and a final aligned image is also generated by alignment to the reference image. A diagnostician compares the two final aligned images.

58 Claims, 24 Drawing Sheets

OTHER PUBLICATIONS

J. Liang, et al., "Dynamic chest image analysis: model-based ventilation study with pyramid images", Proceedings of SPIE Medical Imaging 1997: Physiology and Function from Multidimensional Images, SPIE, May 1997, vol. 3033. p. 81-92.

Tanaka, Sanada, et al., "Quantitative Analysis of Respiratory Kinetics in Breathing Chest Radiographs Obtained Using a Dynamic Flat-Panel Detector", Journal of Japan Society of Medical Imaging and Information Sciences, Jan. 2003, vol. 20, Issue 1, p. 13-19.

A. Kano, K. Doi, H. MacMahon, D. Hassell, M. L. Giger, "Digital image substraction to temporally sequential chest images for detection of interval change", Medical Physics, AAPM, vol. 21, Issue 3, Mar. 1994, p. 452-461.

* cited by examiner

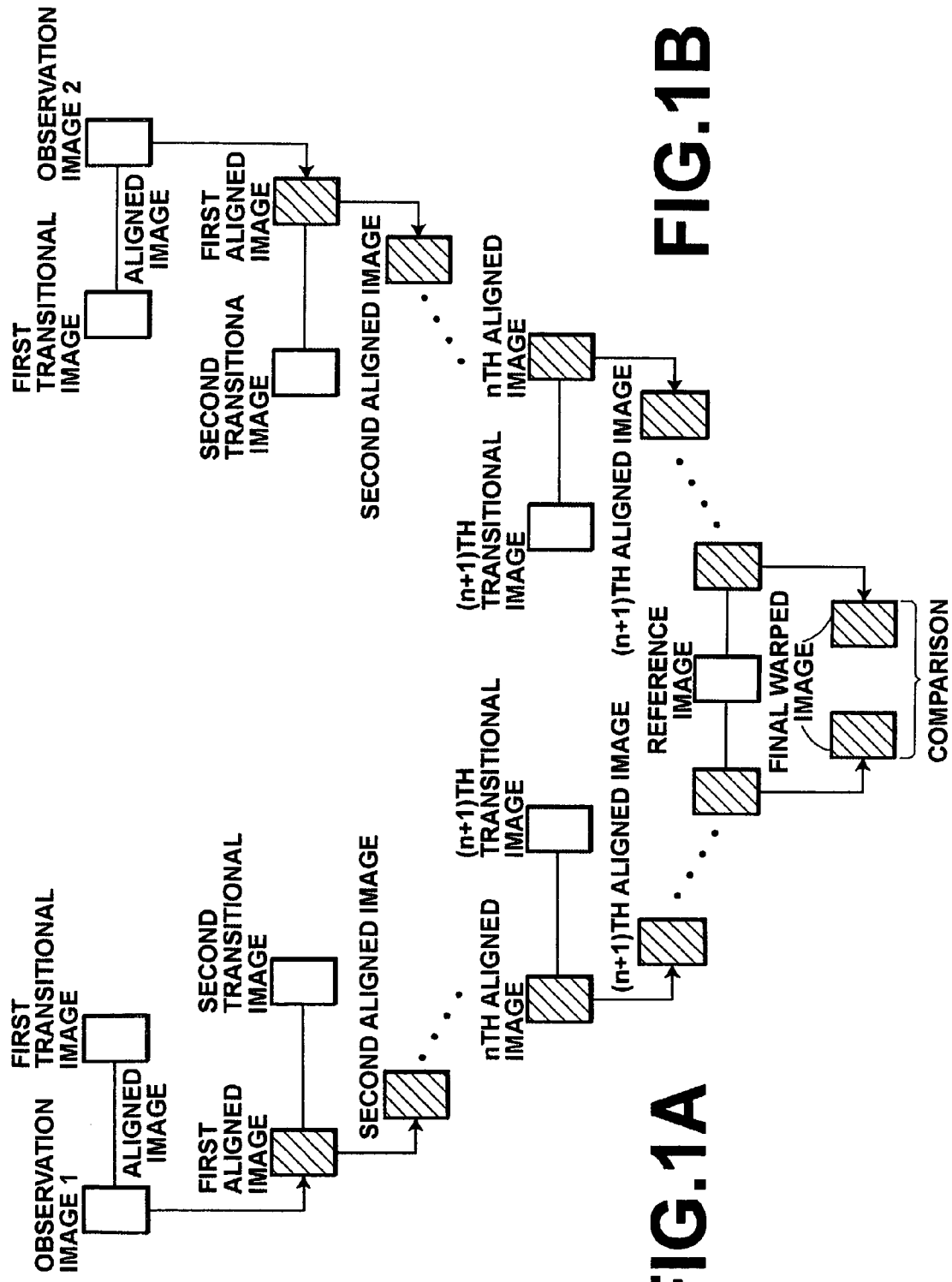

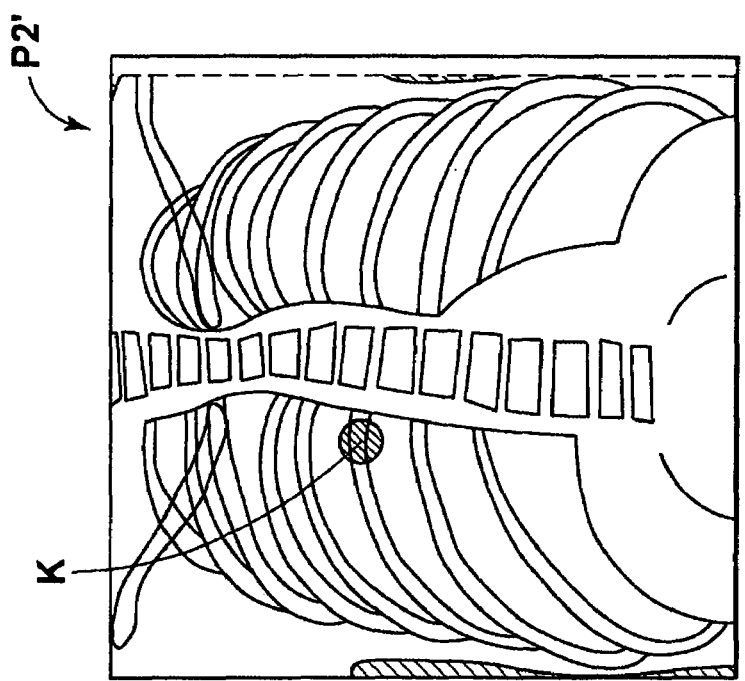
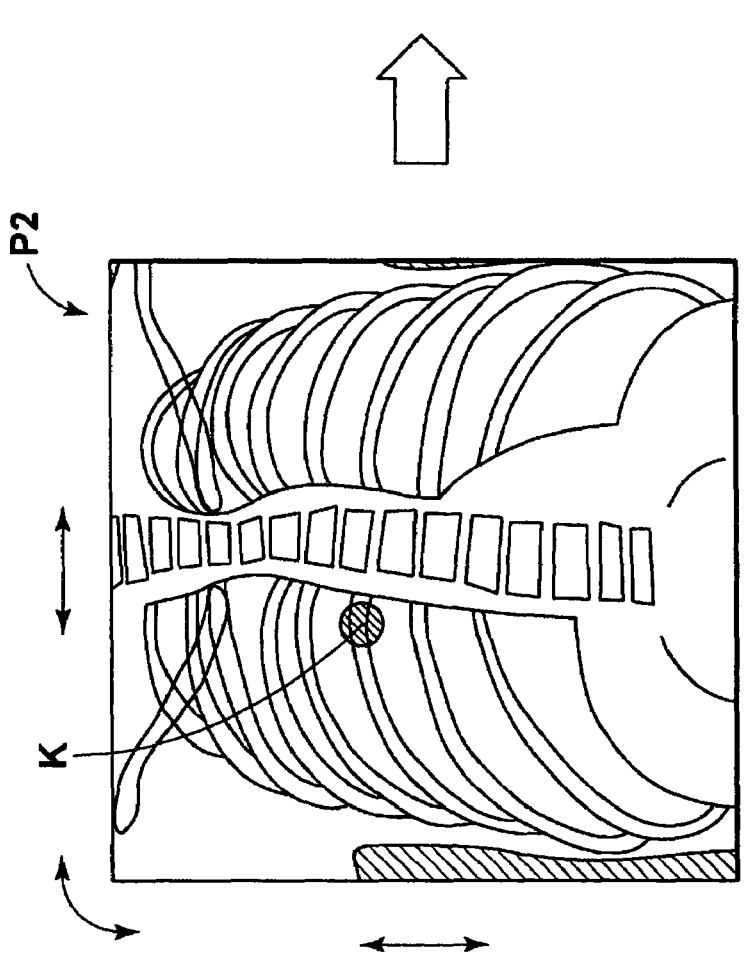
FIG.8

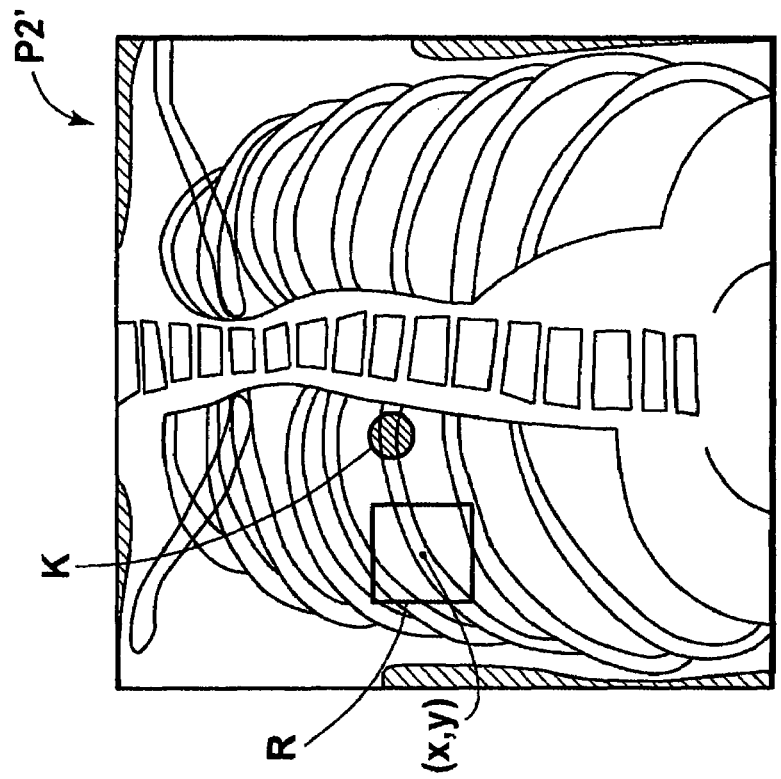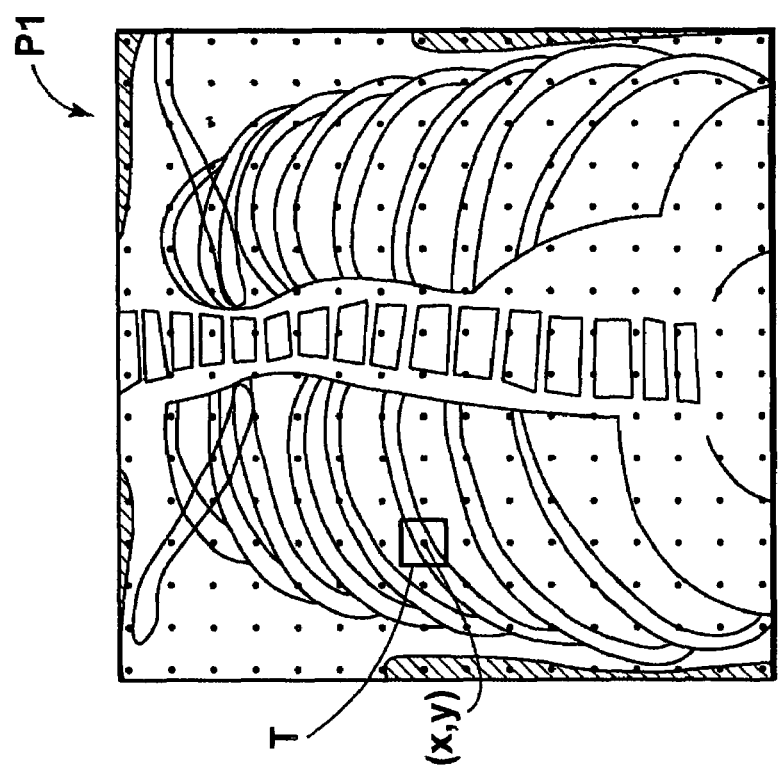
FIG. 9

METHOD AND APPARATUS FOR AIDING IMAGE INTERPRETATION AND COMPUTER-READABLE RECORDING MEDIUM STORING PROGRAM THEREFOR

BACKGROUND OF THE INVENTION

1. Field of the Invention

The present invention relates to a method and an apparatus for aiding image interpretation and to a computer-readable recording medium storing a program therefor. More specifically, the present invention relates to a method and an apparatus for aiding comparative reading of two images that are not adjacent to each other among three or more images arranged in temporal order for representing a change in the state of a subject, and to a computer-readable recording medium storing a program therefor.

2. Description of the Related Art

Comparison and observation of only type of change, based on a plurality of images obtained by photography of a subject showing simultaneous changes of two or more types, is necessary in some cases. In this case, by removing an effect of the change or changes of the other type or types that are not a target of observation, the change of the type as the observation target can efficiently be compared and observed with high accuracy.

For example, diagnosis of respiratory function is attempted based on simple X-ray images representing different phases of the respiratory cycle. In this case, the X-ray images include two types of changes, namely movements of anatomical structures such as ribs and the diaphragm and a change in density in lung fields. Among those changes, the change in density in lung fields is effective for diagnosing pulmonary emphysema or the like accompanying airflow obstruction (an obstructive respiratory disorder) as one type of chronic obstructive pulmonary diseases.

In the case of pulmonary emphysema, an increase in transmissivity in lung fields is shown in a chest X-ray image, reflecting destruction or loss of alveoli and a decrease in lung vessels caused by emphysema, and reflecting abundance of air caused by over-inflation of lungs. In addition, pathological pulmonary emphysema is reflected in a low attenuation area in a chest CT image (Kawamoto and Kanbe, "7. Chronic Obstructive Pulmonary Diseases (in Japanese)", Fourth Plan for Guideline 2002 for clinical examination corresponding to DRG/PPS, Japanese Society of Laboratory Medicine, November 2002, p26). Therefore, in the case of observation of density change in lung fields based on X-ray images representing different respiratory states, an area wherein density and X-ray absorption do not change greatly is detected as an area of abnormal respiration caused by air that remains in lung fields and is not removed by exhalation.

As an attempt to diagnose a respiratory function using simple X-ray images, abnormal respiration can be detected based on a moving image obtained by photography with an image intensifier for representing different phases of respiratory cycle starting from inhalation and ending in exhalation. In order to detect such abnormal respiration with high accuracy, alignment of the images is reported to be necessary (see J. Liang, et al., "Dynamic chest image analysis: model-based ventilation study with pyramid images", Proceedings of SPIE Medical Imaging 1997: Physiology and Function from Multidimensional Images, SPIE, May 1997, Vol. 3033, p 81-92). Furthermore, discussion has also been made on usage of a digital X-ray imaging apparatus adopting a flat-panel detector for moving images that are getting used practically. By using a moving chest image in a resolution higher than a resolution by an image intensifier, information on respiratory function can be obtained more accurately from a change in lung-field density. In addition, as shown in FIG. 24, an analysis has been attempted by generating a moving subtraction image through alignment of two neighboring images in a moving image and calculation of a difference between the two images (see Tanaka, Sanada, et al., *Qantitative Analysis of Respiratory Kinetics in Breathing Chest Radiographs Obtained Using a Dynamic Flat-Panel Detector*", Journal of Japan Society of Medical Imaging and Information Sciences, Japan Society of Medical Imaging and Information Sciences, January 2003, Vol. 20, Issue 1, p 13-19).

Meanwhile, a temporal subtraction technique is known for generating a subtraction image based on a difference between two images through alignment of the same subject in the two images obtained by photography at different times (see Japanese Unexamined Patent Publications No. 7(1995)-037074, U.S. Pat. No. 5,790,690, U.S. Patent Laid-Open Nos. 20010002934 and 20010048757 and A. Kano, K. Doi, H. MacMahon, D. Hassell, M. L. Giger, "Digital image subtraction of temporally sequential chest images for detection of interval change", Medical Physics, AAPM, Vol.21, Issue 3, March 1994, p. 453-461) This technique is effective in the case where radiographs obtained by photography of the chest of the same subject at present and at one year earlier are compared to each other, for example.

In diagnoses of abnormal respiration of lungs, it is thought to be important to observe a change in density in lung fields through comparison of a maximal inhalation image and a maximal exhalation image.

On the other hand, in the non-patent references written by Liang et al. and Tanaka et al., a serial change is only observed in images representing different respiratory states or in images adjacent to each other in a moving image. Therefore, a density change in lung fields is only indirectly and ineffectively understood between a maximal inhalation image and a maximal exhalation image.

Furthermore, a size change in lung fields is large between a maximal inhalation image and a maximal exhalation image, due to three-dimensional movements of ribs and the diaphragm. In addition, ribs show different movements in different directions from the soft tissue in lung fields. Therefore, direct comparison of a maximal inhalation image and a maximal exhalation image is difficult. For this reason, alignment can be carried out between a subject in a maximal inhalation image and a maximal exhalation image by using alignment processing in the conventional temporal subtraction technique described in Japanese Unexamined Patent Publications No. 7(1995)-037074, U.S. Pat. No. 5,790,690 and U.S. Patent Laid-Open Nos. 20010002934 and 20010048757. However, since the images have too much a difference as has been described above, alignment cannot be carried out with high accuracy.

Consequently, in the case where comparative image reading is carried out between two images that are not adjacent to each other in three or more images arranged in temporal order for representing changes in a subject, observation of a necessary one of the changes alone has been impossible through the comparative image reading even if an effect of the other change or changes is removed after alignment of the subject in the two images.

SUMMARY OF THE INVENTION

The present invention has been conceived based on consideration of the above circumstances. An object of the present invention is therefore to provide a method and an apparatus for aiding efficient comparative image reading through alignment of a subject in two images that are not adjacent to each other in three or more images arranged in temporal order representing a change in a state of the subject, and to provide a computer-readable recording medium storing a program therefor.

An aspect of an image interpretation aiding method of the present invention is a method of aiding comparative reading of two observation images that are not adjacent to each other in three or more images arranged in temporal order representing a change in a state of a subject, by sequentially aligning the subject in each of the observation images to the subject in a neighboring one of the three or more images and finally to the subject in one of the three or more images used as a reference image.

FIGS. 1A and 1B are diagrams showing how two observation images 1 and 2 are aligned to a reference image. As shown in FIG. 1, the image interpretation aiding method of the present invention uses one of three or more images representing a change in a state of a subject as the reference image. The subject in the observation image 1 is aligned to the subject in a first transitional image that is adjacent to the observation image 1 and located between the observation image 1 and the reference image. In this manner, a first aligned image is generated by transforming a position of the subject in the observation image 1. For a natural number n, the subject in an nth aligned image is aligned to the subject in an (n+1)th transitional image adjacent to an nth transitional image and located between the nth transitional image and the reference image. In this manner, an (n+1)th aligned image is generated by transforming a position of the subject in the nth aligned image. This procedure is repeated from n=1 until the reference image becomes the (n+1)th transitional image. For the observation image 2, a first aligned image is generated in the same manner, and the procedure of generating an (n+1)th aligned image from an nth aligned image is repeated until the reference image becomes an (n+1)th transitional image. In this manner, the subject in the two observation images is aligned to the subject in the reference image, and two final aligned images are obtained.

The reference image may be one of the observation images. Therefore, the image interpretation aiding method of the present invention may be expressed as follows.

In other words, the image interpretation aiding method of the present invention is a method of aiding comparative reading of two observation images that are not adjacent to each other in temporal order among three or more images 1 to N representing a change in a state of a subject. Let one of the observation images be referred to as an image K, and an image L among the three or more images is used as a reference image (where N is a natural number equal to or greater than 3 and K and L are natural numbers equal to or smaller than N).

(1) In the Case Where K is Smaller Than L, the subject in the observation image K is aligned to the subject in an image (K+1), and an aligned image (K+1) is generated by transforming a position of the subject in the observation image K.

For a natural number m satisfying $(K+1) \leq m \leq (L-1)$, the subject in an aligned image m is aligned to the subject in an image (m+1), and an aligned image (m+1) is generated by transforming a position of the subject in the aligned image m. This procedure is repeated until m=(L-1) while adding 1 to m at each time of repetition. In this manner, a final aligned image is generated by aligning the subject in the image K to the subject in the reference image L.

(2) In the Case Where K is Larger Than L, the subject in the observation image K is aligned to the subject in an image (K-1), and an aligned image (K-1) is generated by transforming a position of the subject in the image K.

For a natural number m satisfying $(L+1) \leq m \leq (K-1)$, the subject in an image m is aligned to the subject in an image (m-1), and an aligned image (m-1) is generated by transforming a position of the subject in the image m. This procedure is repeated until m=(L+1) while subtracting 1 from m at each time of repetition. In this manner, a final aligned image is generated by aligning the subject in the observation image K to the subject in the reference image L.

(3) In the Case Where K is Equal to L, the observation image K is used as one final aligned image, and another final aligned image is also generated by repeating the same procedure for the other observation image.

In this manner, the two final aligned images are generated representing the subject aligned to the subject in the reference image L.

In another aspect of the image interpretation aiding method of the present invention, only alignment result information may be stored without aligned-image generation at each time the subject is aligned so that the final aligned images can be generated based on the alignment result information through alignment to the subject in the reference image. In other words, alignment processing is carried out on a subject included in one of two observation images (referred to as an observation image 1) so that the subject is aligned to the subject in a first transitional image that is adjacent to the observation image 1 and located between the observation image 1 and a reference image when arranged in temporal order. In this manner, first alignment result information is generated. Thereafter, for a natural number n, alignment processing is carried out on the subject in the observation image 1 whose position is transformed based on the first alignment result information to nth alignment result information so that the subject in the observation image 1 is aligned to the subject in an (n+1)th transitional image that is adjacent to an nth transitional image and located between the nth transitional image and the reference image. In this manner, (n+1)th alignment result information is generated. By repeating the procedure from n=1 until the reference image becomes the (n+1)th transitional image. Likewise, for the other observation image (referred to as an observation image 2), first alignment result information is generated, and the procedure of generating (n+1)th alignment result information is repeated until the reference image becomes an (n+1)th transitional image. A position of the subject in each of the observation images is then transformed based on all the alignment result information generated for the corresponding one of the observation images so that the subject in each of the observation images is aligned to the subject in the reference image. In this manner, two final aligned images are generated.

A final subtraction image may be generated based on a difference between the two final aligned images.

A final map image may also be generated wherein pixel values in the final subtraction image are classified into two or more segments according to one or more threshold values so that the segments can be identified therein.

For at least one of the transitional images located between either one of the observation images and the reference image, the subject therein may be aligned to the subject in the reference image in the same manner as the observation images so that a final aligned image or final aligned images can be generated. Subtraction images can then be generated based on differences between one of the two final aligned images generated from one of the two observation images and the final aligned images generated from the other observation image and the transitional image or images. In FIG. 2A are shown 5 images arranged in temporal order representing a change in a state of a subject. The two images at both ends are respectively referred to as the observation image 1 and the observation image 2, while the image in the middle is referred to as the reference image. The procedure of generating the subtraction images shown in FIG. 2B is carried out between the final aligned image based on the observation image 1 and the final aligned images based on the remaining images. As shown in FIG. 2A, the subject in the observation images 1 and 2 and transitional images 1 and 2 is aligned to the subject in the reference image, and the final aligned images are generated. The reference image is not subjected to any alignment processing, and used as one of the final aligned images. Thereafter, as shown in FIG. 2B, subtraction images 1 to 4 are generated based on differences between an observation image 1' as the final aligned image of the observation image 1 and the remaining final aligned images (referred to as an observation image 2', a transitional image 1' a transitional image 2' and the reference image). The final aligned images are generated for the respective transitional images, in this case.

A map image may also be generated wherein pixel values in each of the subtraction images are classified into two or more segments according to one or more threshold values so that the segments can be identified therein.

In addition, one of the two images being subjected to the alignment processing may be divided into local areas each of which has a predetermined number of pixels. In this case, direction and/or magnitude of movement of each of the local areas is found based on direction and/or magnitude of movement of each of pixels found through the alignment processing so that a local movement image representing the direction and/or the magnitude of the movement of each of the local areas can be generated in relation to a position thereof.

Alternatively, direction and magnitude of movements of pixels in two of the three or more images that are not adjacent to each other when arranged in the order of the state change in the subject may be found by vector composition of direction and magnitude of movements of pixels found through the alignment processing on the images located between the two images. In this case, one of the two images is divided into local areas each of which has a predetermined number of pixels, and direction and/or magnitude of movement of each of the local areas are found between the two images, based on the direction and the magnitude of the movements of the pixels in the two images. In this manner, a local movement image may be generated for representing the direction and/or the magnitude of the movement of each of the local areas in relation to a position thereof.

In the case where the subject includes at least bones and soft tissue, and the three or more images representing the change in the state of the subject are medical radiographs, soft-tissue images including the soft tissue alone may be generated from the three or more medical radiographs. In this case, the alignment processing can be carried out on each of the soft-tissue images.

An image interpretation aiding apparatus of the present invention will be described next. The image interpretation aiding apparatus of the present invention is an apparatus for realizing the image interpretation aiding method of the present invention.

More specifically, one aspect of the image interpretation aiding apparatus of the present invention is an apparatus for aiding comparative image reading between two observation images that are not adjacent to each other in three or more images arranged in temporal order representing a change in a state of a subject. The image interpretation aiding apparatus of the present invention comprises cumulative aligned image generation means. The cumulative aligned image generation means uses one of the three or more images as a reference image, and carries out alignment processing wherein the subject in one of the observation images is aligned to the subject in a first transitional image that is adjacent to the observation image and located between the observation image and the reference image. In this manner, the cumulative aligned image generation means generates a first aligned image by transforming a position of the subject in the observation image. The cumulative aligned image generation means then carries out alignment processing for aligning the subject in an nth aligned image (where n is a natural number) to the subject in an (n+1)th transitional image that is adjacent to an nth transitional image and located between the nth transitional image and the reference image. In this manner, the cumulative aligned image generation means generates an (n+1)th aligned image by transforming a position of the subject in the nth aligned image. This cumulative aligned image generation means repeats this procedure from n=1 until the reference image becomes the (n+1)th transitional image. For the other observation image, the cumulative aligned image generation means generates a first aligned image in the same manner, and repeats the procedure of generating an (n+1)th aligned image from an nth aligned image until the reference image becomes an (n+1) th transitional image. In this manner, the cumulative aligned image generation means generates two final aligned images by aligning the subject in the two observation images to the subject in the reference image.

Another aspect of the image interpretation aiding apparatus of the present invention comprises cumulative alignment information generation means and final aligned image generation means, instead of the cumulative aligned image generation means. The cumulative alignment information generation means carries out alignment processing on a subject included in one of two observation images so that the subject is aligned to the subject in a first transitional image adjacent to the observation image and located between the observation image and a reference image. In this manner, the cumulative alignment information generation means generates first alignment result information. Thereafter, for a natural number n, the cumulative alignment information generation means carries out alignment processing on the subject in the observation image whose position is transformed according to the first alignment result information to nth alignment result information so that the subject in the observation image is aligned to the subject in an (n+1)th transitional image that is adjacent to an nth transitional image and located between the nth transitional image and the reference image. In this manner, the cumulative alignment information generation means generates (n+1) th alignment result information and repeats the procedure from n=1 until the reference image becomes the (n+1)th transitional image. Likewise, for the other observation image, the cumulative alignment information generation means generates first alignment result information, and repeats the procedure of generating (n+1)th alignment result information until the reference image becomes an (n+1)th transitional image. The final aligned image generation means transforms a position of the subject in each of the observation images based on the alignment result information generated for the corresponding one of the observation images, and aligns the subject to the subject in the reference image. In this manner, the final aligned image generation means generates two final aligned images.

The image interpretation aiding apparatus of the present invention may further comprise final subtraction image generation means for generating a final subtraction image based on a difference between the two final aligned images.

The image interpretation aiding apparatus of the present invention may further comprise final map image generation means for classifying pixel values in the final subtraction image into two or more segments according to one or more threshold values and for generating a final map image enabling recognition of the segments in the final subtraction image.

The cumulative aligned image generation means may further comprise means for generating a final aligned image or final aligned images by aligning the subject in at least one of the transitional images located between either one of the observation images and the reference image to the subject in the reference image in the same manner as the observation images. The means then generates subtraction images based on differences between one of the two final aligned images generated from one of the observation images and the final aligned images generated from the other observation image and the transitional image or images.

The image interpretation aiding apparatus of the present invention may also comprise means for classifying pixel values in each of the subtraction images into two or more segments according to one or more threshold values and for generating map images that respectively enable recognition of the segments in the corresponding subtraction images.

The image interpretation aiding apparatus of the present invention may further comprise means for dividing one of the two images being subjected to the alignment processing into local areas each of which has a predetermined number of pixels, for finding direction and/or magnitude of movement of each of the local areas based on direction and magnitude of movements of pixels found through the alignment processing, and for generating a local movement image representing the direction and/or the magnitude of the movement of each of the local areas in relation to a position thereof.

Alternatively, the image interpretation aiding apparatus of the present invention may comprise means for finding direction and magnitude of movements of pixels in two of the three or more images that are not adjacent to each other when arranged in the order of the state change in the subject by vector composition of direction and magnitude of movements of pixels found through the alignment processing on the images located between the two images, for dividing one of the two images into local areas each of which has a predetermined number of pixels, for finding direction and/or magnitude of movement of each of the local areas between the two images according to the direction and the magnitude of the movements of the pixels in the two images, and for generating a local movement image representing the direction and/or the magnitude of the movement of each of the local areas in relation to a position thereof.

In the case where the subject includes at least bones and soft tissue and the three or more images representing the change in the state of the subject are medical radiographs, the image interpretation aiding apparatus of the present invention may comprise soft-tissue image generation means for generating soft-tissue images including the soft tissue alone from the three or more medical radiographs. In this case, the alignment processing can be carried out by using the soft-tissue images as the three or more images subjected to the alignment processing.

A computer-readable recording medium of the present invention storing an image interpretation aiding program will be described next. The image interpretation aiding program recorded in the computer-readable recording medium of the present invention causes a computer to execute the image interpretation aiding method described above. In other words, the image interpretation aiding program causes a computer to function as the means of the image interpretation aiding apparatus described above.

More specifically, one aspect of the image interpretation aiding program causes a computer to have a function of aiding comparative image reading between two observation images that are not adjacent to each other in three or more images arranged in temporal order representing a change in a state of a subject, and the program causes the computer to function as cumulative aligned image generation means for determining one of the three or more images used as a reference image, for generating a first aligned image by transforming a position of the subject in one of the observation images through alignment processing wherein the subject in the observation image is aligned to the subject in a first transitional image that is adjacent to the observation image and located between the observation image and the reference image, for repeating generation of an (n+1)th aligned image (where n is a natural number starting from 1) by transforming a position of the subject in an nth aligned image through alignment processing wherein the subject in the nth aligned image is aligned to the subject in an (n+1)th transitional image that is adjacent to an nth transitional image and located between the nth transitional image and the reference image until the reference image becomes the (n+1)th transitional image, for generating a first aligned image from the other observation image in the same manner and for repeating generation of an (n+1)th aligned image from an nth aligned image in the same manner until the reference image becomes an (n+1)th transitional image, whereby two final aligned images are generated having the subject in the two observation images aligned to the subject in the reference image.

Another aspect of the image interpretation aiding program causes a computer to function as cumulative alignment information generation means for setting one of three or more images arranged in temporal order representing a change in a state of a subject as a reference image, for generating first alignment result information by carrying out alignment processing on the subject included in one of two observation images that are not adjacent to each other in the three or more images so that the subject in the observation image is aligned to the subject in a first transitional image adjacent to the observation image and located between the observation image and the reference image, for repeating generation of (n+1)th alignment result information where n is a natural number starting from 1 by carrying out alignment processing on the subject in the observation image whose position is transformed according to the first alignment result information to nth alignment result information so that the subject in the observation image is aligned to the subject in an (n+1)th transitional image that is adjacent to an nth transitional image and located between the nth transitional image and the reference image until the reference image becomes the (n+1)th transitional image, for generating first alignment result information from the other observation image in the same manner, and for repeating generation of (n+1)th alignment result information in the same manner until the reference image becomes an (n+1)th transitional image, and causes the computer to also function as final aligned image generation means for generating two final aligned images by aligning the subject in the respective observation images to the subject in the reference image through transformation of a position of the subject in the respective observation images based on all the alignment result information generated for the respective observation images.

The image interpretation aiding program may further cause the computer to function as final subtraction image generation means for generating a final subtraction image according to a difference between the two final aligned images.

The image interpretation aiding program may further cause the computer to function as final map image generation means for classifying pixel values in the final subtraction image into two or more segments according to one or more threshold values and for generating a final map image enabling recognition of the segments in the final subtraction image.

The image interpretation aiding program may also cause the computer to cause the cumulative aligned image generation means to generate a final aligned image or final aligned images by aligning the subject in at least one of the transitional images located between either one of the observation images and the reference image to the subject in the reference image in the same manner as the observation images, and may cause the computer to function as means for generating subtraction images based on a difference between one of the two final aligned images generated from one of the observation images and the final aligned images generated from the other observation image and the transitional image or images.

The image interpretation aiding program may also cause the computer to function as means for classifying pixel values in the respective subtraction images into two or more segments according to one or more threshold values and for generating map images enabling recognition of the segments in the corresponding subtraction images.

The image interpretation aiding program may further cause the computer to function as means for dividing one of the two images being subjected to the alignment processing into local areas each of which has a predetermined number of pixels, for finding direction and/or magnitude of movement of each of the local areas according to direction and magnitude of movements of pixels found through the alignment processing, and for generating a local movement image representing the direction and/or the magnitude of the movement of each of the local areas in relation to a position thereof.

Alternatively, the image interpretation aiding program may further cause the computer to function as means for finding direction and magnitude of movements of pixels in two of the three or more images that are not adjacent to each other when arranged in the order of the state change in the subject through vector composition of direction and magnitude of movements of pixels found through the alignment processing on the images located between the two images, for dividing one of the two images into local areas each of which has a predetermined number of pixels, for finding direction and/or magnitude of movement of each of the local areas between the two images according to the direction and the magnitude of the movements of the pixels in the two images, and for generating a local movement image representing the direction and/or the magnitude of the movement of each of the local areas in relation to a position thereof.

In the case where the subject includes at least bones and soft tissue and the three or more images representing the change in the state of the subject are medical radiographs, the image interpretation aiding program may also cause the computer to function as soft-tissue image generation means for generating soft-tissue images including the soft tissue alone from the three or more medical radiographs. In this case, the program causes the computer to carry out the alignment processing by using the soft-tissue images as the three or more images.

The image interpretation aiding method and the image interpretation aiding apparatus of the present invention will be described below in detail.

As an example of the three or more images representing the change in the state of the subject, medical radiographs of human chest representing different respiratory states may be used.

In this case, it is preferable for the two observation images to be a maximal inhalation image and a maximal exhalation image.

In the case where the number of the observation images is 3 or more, the alignment processing can be carried out for alignment to the subject in the reference image, regarding an arbitrary combination of two of the observation images by the image interpretation aiding method and the image interpretation aiding apparatus of the present invention. Therefore, the present invention can also be applied to this case.

The reference image may be an image located between the two observation images, or one of the observation images (see FIG. 3A). In the latter case, the observation image that is used as the reference image is not subjected to the alignment processing, and used as one of the final aligned images. The reference image may also be an image that is located outside the observation images when arranged the in temporal order (see FIG. 3B). In the case where the reference image is one of the observation images, repetition of the alignment processing is increased for the other observation image. Therefore, an error caused by the alignment processing becomes larger, and noise may increase. In the case where the reference image is an image outside the observation images, repetition of the alignment processing for the two observation images is increased than in the case of a reference image located between the two observation images. Therefore, a processing load increases. For this reason, it is ideal for the reference image to be located between the two observation images, with respect to the alignment processing and accuracy of the aligned images. However, in the case where a position or a shape of the subject in the reference image plays an important role in the comparative image reading, it is effective for the reference image to be one of the observation images or an image outside the observation images.

The alignment processing refers to image processing wherein the position of the subject in each of the two images is aligned to each other, through linear or non-linear transformation on the position in at least one of the images. As an example of the linear transformation, processing for rotating and translating all the pixels to a predetermined direction by affine transformation may be used. The non-linear transformation refers to transformation other than the linear transformation, and each of the pixels is shifted one by one by the non-linear transformation. More specifically, correspondence between the pixels in the two images is found by paying attention to the position of the subject in the two images. A shift vector from one of the images to the other image is then calculated for each of the pixels, and used for the non-linear transformation. Furthermore, as has been described as the temporal subtraction techniques in Japanese Unexamined Patent Publication No. 7(1995)-37074, U.S. Pat. No. 5,790,690 and U.S. Patent Laid-Open NO. 20010048757, a method combining global matching for rough alignment as the linear transformation with local matching as the non-linear transformation may also be used.

Each of the aligned images refers to an image generated by shifting each of the pixels according to a predetermined vector found through the linear or non-linear transformation. The image having been subjected to the non-linear transformation is called a warped image (see Japanese Unexamined Patent Publication No. 7(1995)-37074, U.S. Pat. No. 5,790,690 and U.S. Patent Laid-Open No. 20010048757).

The alignment result information refers to the shift vector for each of the pixels obtained by the linear or non-linear transformation. The shift vector represents the direction and the magnitude of movement of each of the pixels.

The procedure of generating the (n+1)th aligned image from the nth aligned image and the procedure of generating the (n+1)th alignment result information from one of the observation images and the first to nth alignment result information do not need to be carried out in the case where the observation image is an image adjacent to the reference image.

The final map image and the map image may be generated by dividing each of the original images into local blocks having a predetermined number of pixels and by carrying out thresholding on an averaged pixel value in each of the blocks.

It is preferable for the number of pixels in each of the local areas, that is, a size of each of the local areas to be set appropriately for observation of the change in the state of the subject. For example, in the case of diagnosis of respiratory function of lungs, observation of local respiratory function can be carried out efficiently if a radiograph of lungs is divided into local areas whose respective size is almost the same as a 6~10 mm tissue called a secondary lobe comprising alveoli.

The direction and the magnitude of the movements of the local areas can be found by composition of the vectors representing the direction and the magnitude of the movements of the pixels therein, for example.

In the local movement image, the direction and the magnitude of the movement of each of the local areas are visualized in relation to the position thereof. In this case, the direction and the magnitude of the movements of the local areas may be superposed on either one of the two images that are subjected to the alignment processing or on the aligned image representing the subject whose position has been transformed through the alignment processing.

In the case where the two images (that are not adjacent to each other when arranged in the order of the change in the state of the subject) are a kth transitional image and an mth transitional image relative to one of the observation images, the alignment processing to be carried out thereon includes alignment processing starting from a kth aligned image and a (k+1)th transitional image, then a (k+1)th aligned image and a (k+2)th transitional image, then a (k+2)th aligned image and a (k+3)th transitional image, and so on and ending in an (m−1)th aligned image and the mth transitional image.

The direction and/or the magnitude of the movements of the local areas may be found at various steps of the change in the state of the subject so that local movement images can be generated therefrom. In this case, the local movement images may be displayed in order of the state change. Alternatively, the local movement images may be displayed in the form of a moving image by serially changing the local movement images to be displayed at predetermined intervals.

As an example of generating the soft-tissue images, an energy subtraction method may be used. In an energy subtraction method, two original images having different energy distributions are obtained by photography of the same subject at almost the same time under different tube voltages. Simple subtraction or weighted subtraction is carried out on a high-voltage image (an ordinary radiograph) and a low-voltage image (an image generated by suppressing high voltage) comprising the two original image, and an image solely including the bones or the soft tissue is generated (see Japanese Unexamined Patent Publications No. Hei 11(1999)-205682 and 2000-60834).

According to the image interpretation aiding method and the image interpretation aiding apparatus of the present invention, regarding the two observation images among the three or more images arranged in temporal order for representing the change in the state of the subject, the first aligned image is generated through alignment processing for aligning the subject in one of the two observation images to the subject in the transitional image adjacent to the observation image. Another one of the aligned images is then generated by further aligning the subject in the first aligned image to the subject in the transitional image adjacent to the first aligned image. By repeating this procedure, the subject in the observation images is aligned to the subject in the reference image, and the final aligned images are generated. Therefore, the subject in the two final aligned images generated from the two observation images is aligned to the subject in the reference image. Consequently, the subject in the two observation images that are not adjacent to each other can be aligned with high accuracy. As a result, comparative image reading can be carried out easily between the two observation images, which is effective.

Especially, in the case where comparative image reading is carried out between a maximal inhalation image and a maximal exhalation image among radiographs obtained by photography of a plurality of phases of respiratory cycle, the subject can be aligned with high accuracy, which is critical for diagnosis. Therefore, a person who carries out diagnosis (hereinafter referred to as a diagnostician) can easily compare and read the images, and efficiency in detecting abnormal respiratory disorders can be improved.

Furthermore, in the case where the alignment result information is generated without actual aligned-image generation through the alignment processing but the final aligned images are generated by transformation of the observation images based on all the alignment result information, the number of the aligned images to be generated is decreased, which leads to improvement in processing efficiency.

In the case where the final subtraction image is generated based on the difference between the two final aligned images, the final subtraction image is the subtraction image between the final aligned images having high alignment accuracy. Therefore, an artifact is suppressed in the final subtraction image, which makes the comparative image reading much easier. Especially, in the case where the comparative image reading is carried out between a maximal inhalation image and a maximal exhalation image among radiographs obtained by photography of different respiratory states, reading of the subtraction image wherein an artifact is suppressed leads to clearer diagnosis of respiratory abnormality.

If the final aligned images are generated not only for the observation images but also for at least one of the transitional images located between one of the observation images and the reference image, and if the subtraction images are generated based on the differences between one of the final aligned images generated from one of the two observation images and the remaining final aligned images, the comparative image reading can be carried out between the observation images while an interval change between the two observation images can also be observed in a state wherein the subject has been aligned with high accuracy. Therefore, the comparative image reading can be realized with more accuracy. Especially, in the case where images from a maximal inhalation image and a maximal exhalation image are used for the comparative image reading among radiographs obtained by photography of different phases of respiratory cycle, how air comes in and out of lung fields can be observed, which can improve accuracy of diagnosis.

If the final map image or the map images are generated by carrying out the thresholding on the final subtraction image or the subtraction images, a change between the final aligned images can be visualized, which makes the comparative image reading much easier. Especially, in the case where the comparative image reading is carried out on a maximal inhalation image and a maximal exhalation image among radiographs obtained by photography of different phases of respiratory cycle, the visualization can induce an easier finding of an area of respiratory abnormality in lung fields wherein density does not change greatly.

A density change between the images caused by the change in the state of the subject is easily affected by noise such as an artifact originated from an error in the alignment processing. However, in the case where the local movement image is generated for representing the direction and/or the magnitude of the movements of the local areas in the two images representing different steps of the state change in the subject, the direction and the magnitude of the movements of the local areas are less affected by noise than the density change. Therefore, reduction of diagnostic efficiency or accuracy can be prevented. In the case of diagnosis of respiratory function of lungs, for example, even if the direction and the magnitude of the movements of the local areas rather than the density change are observed between the two images, any of the local areas wherein the movement is not observed represents no movement of air, regardless of the respiratory-state change. Therefore, abnormality in local respiratory function can be diagnosed.

If the local movement images are displayed in order of the state change or in the form of a moving image, how the local areas move according to the change in the state of the subject can be understood serially, which improves diagnostic efficiency and accuracy.

In the case where the soft-tissue images are generated from the radiographs including bones and soft tissue, and if the soft-tissue images are used in the alignment processing, an effect caused by movement of the bones in the alignment processing can be weakened. Therefore, accuracy of the alignment processing can be improved, and a change in the soft tissue can be observed with ease. Especially, if the soft-tissue images are generated from radiographs obtained by photography of different phases of respiratory cycle and used in the alignment processing, the soft tissue can be aligned even in the case where ribs and the soft tissue move in different directions due to a change in a three-dimensional positioning of the subject at the time of photography. In addition, an effect caused by the movement of the ribs can almost be eliminated, which leads to an easier observation of a density change in lung fields.

BRIEF DESCRIPTION OF THE DRAWINGS

FIGS. 1A and 1B are diagrams showing how observation images 1 and 2 are aligned to a reference image according to a method of the present invention;

FIG. 8 is a diagram showing global matching processing carried out by the cumulative warped image generation means;

FIG. 9 is a diagram showing local matching processing carried out by the cumulative warped image generation means;

DESCRIPTION OF THE PREFERRED EMBODIMENTS

Hereinafter, embodiments of the present invention will be described with reference to the accompanying drawings in the case where comparative image reading is carried out between a maximal inhalation image and a maximal exhalation image among radiographs obtained by photography of a plurality of phases of respiratory cycle.

Figure 2A:
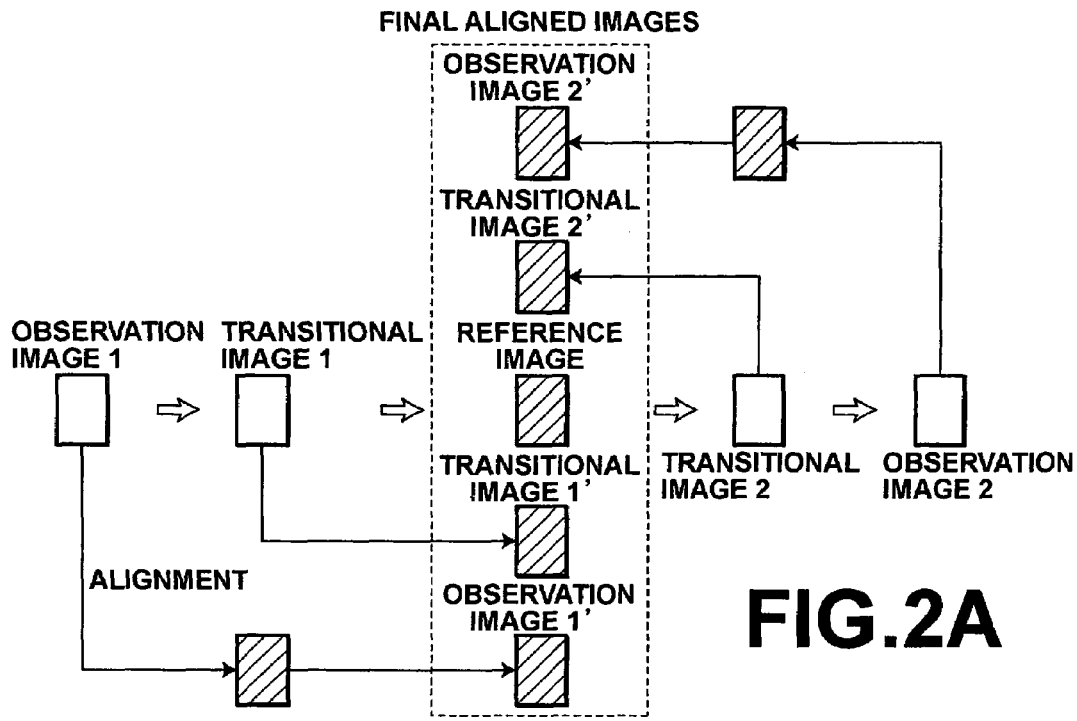
FIG. 2A shows how final aligned images are generated from 5 images.
Figure 2B:
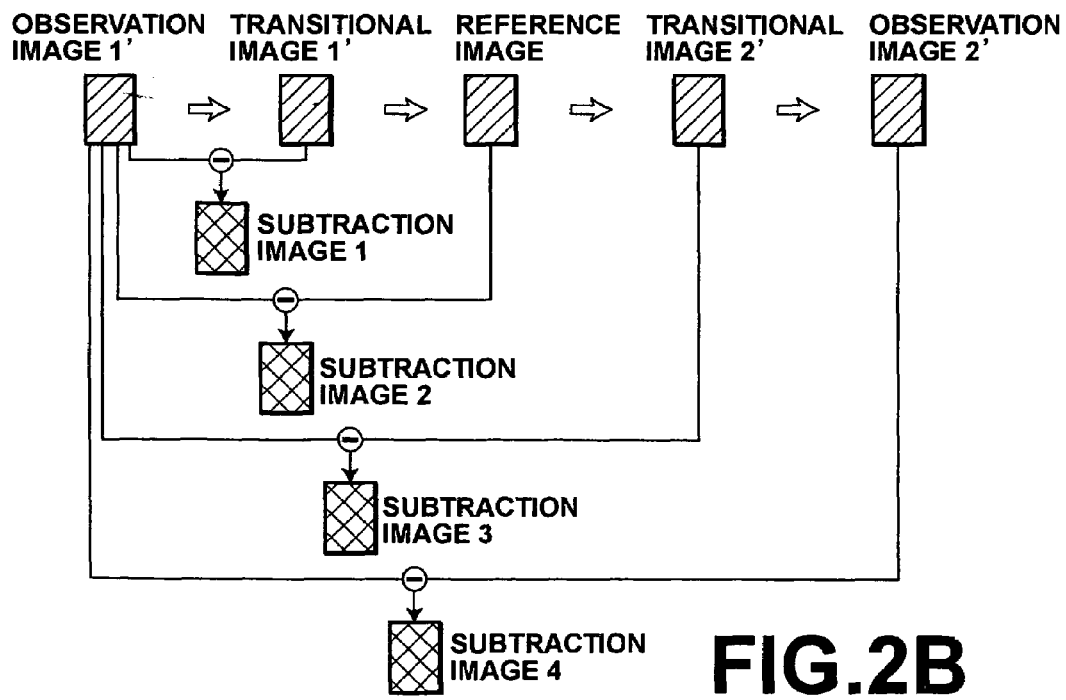
FIG. 2B shows how subtraction images are generated from one of the final aligned images and the remaining final aligned images, according to the method of the present invention.
Figure 3A:
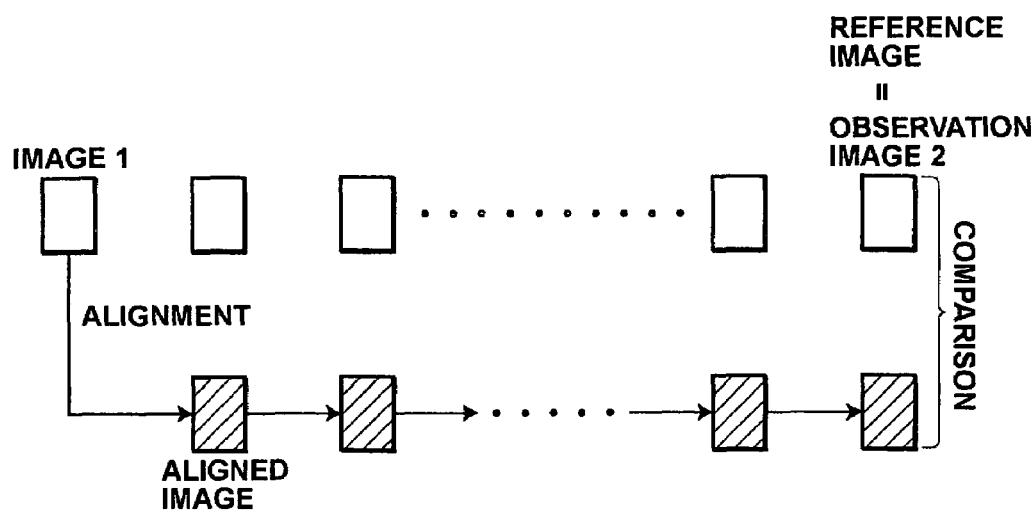
FIGS. 3A and 3B show how the method of the present invention is applied to the case where the reference image is one of the observation images and to the case where the reference image is outside the observation images, respectively.
Figure 3B:
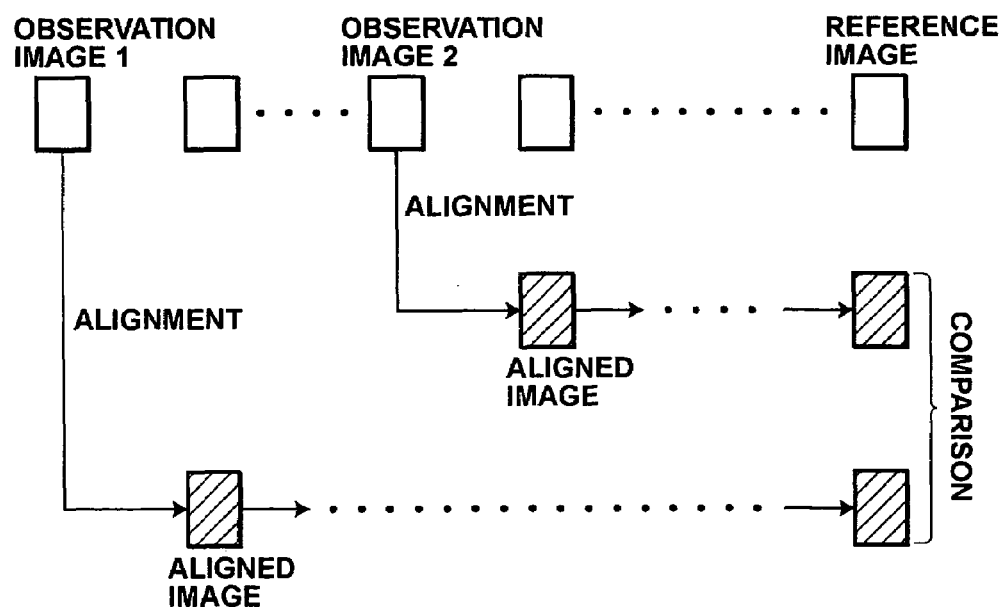
Figure 4:
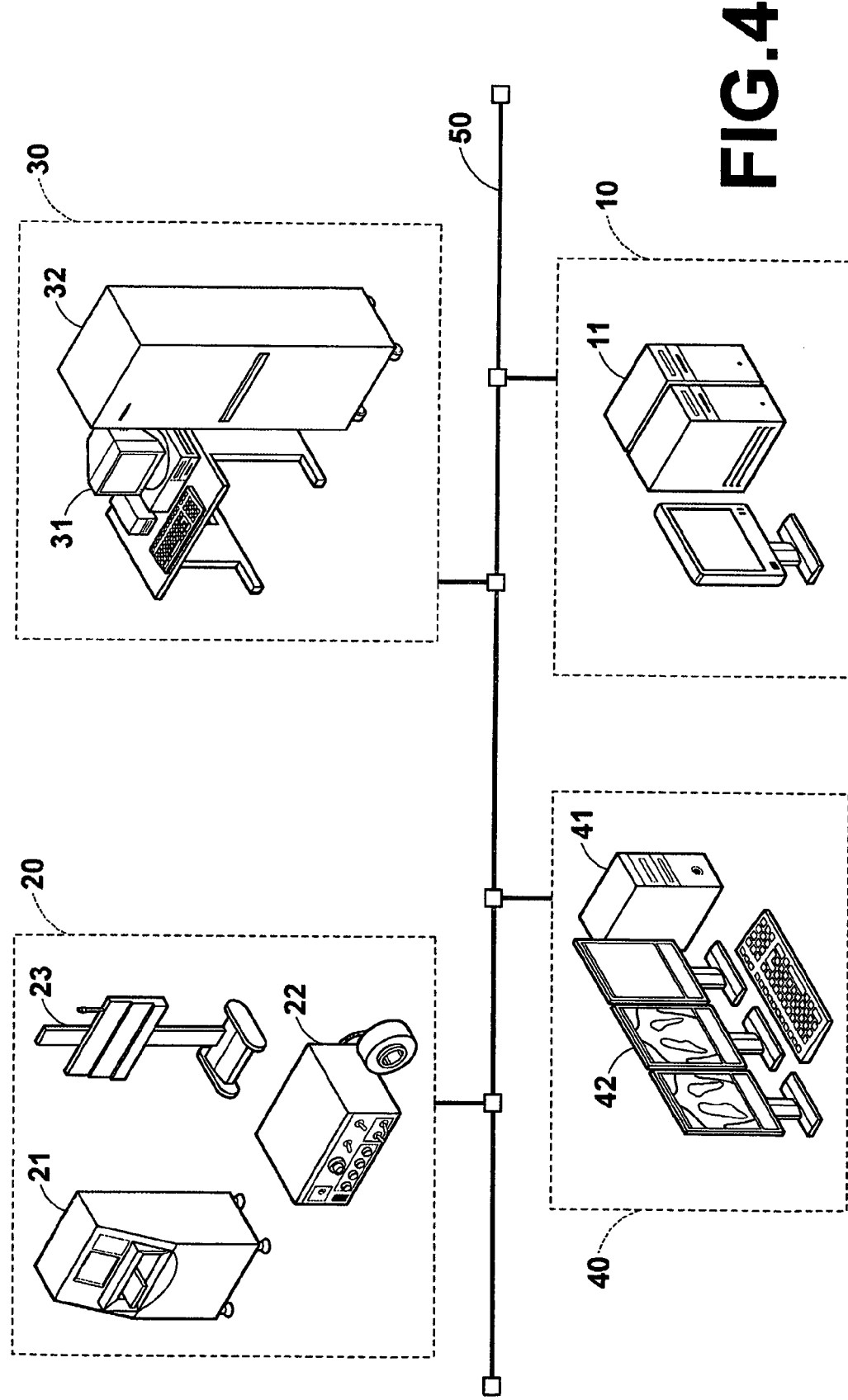
FIG. 4 is a block diagram showing the configuration of a chest image diagnosis aiding system in embodiments of the present invention.

FIG. 4 is a block diagram showing the configuration of a chest image diagnosis aiding system in the embodiments of the present invention. As shown in FIG. 4, an image photography/reading system 20, an image management system 30, an image interpretation aiding system 10, and an image display system 40 are connected in a communicable state via a network 50 such as a LAN.

The image photography/reading system 20 obtains the radiographs representing the different phases of respiratory cycle by using the chest of a patient as a subject. The image photography/reading system 20 comprises a CR (Computed Radiography) apparatus 21, an image intensifier 22, and a digital X-ray imaging apparatus 23 having a flat-panel display (FPD) for moving images (hereinafter referred to as the FPD apparatus 23).

The image interpretation aiding system 10 carries out image processing on the radiographs obtained by the image photography/reading system 20, and generates images appropriate for interpretation. The image interpretation aiding system 10 includes an image processing server 11, and image interpretation aiding apparatuses in the embodiments of the present invention are installed in the image processing server 11. Programs comprising means of the image interpretation aiding apparatuses that will be described later are stored in a recording medium that can be read by the image processing server 11.

The image management system 30 stores and manages the images generated by the image photography/reading system 20 and the image interpretation aiding system 10. The image management system 30 comprises an image management server 31, a large-capacity external storage 32, and database management software (such as software for managing an object relational database).

The image display system 40 displays the images generated by the image photography/reading system 20 and the image interpretation aiding system 10, and comprises a client PC 41 and three high-definition liquid crystal display devices 42.

An image interpretation aiding apparatus A of a first embodiment of the present invention has a function of generating two final warped images by aligning the subject in the maximal inhalation image and the maximal exhalation image to the subject in a predetermined reference image. A diagnostician interprets the two final warped images through comparative image reading thereof.

Figure 5:
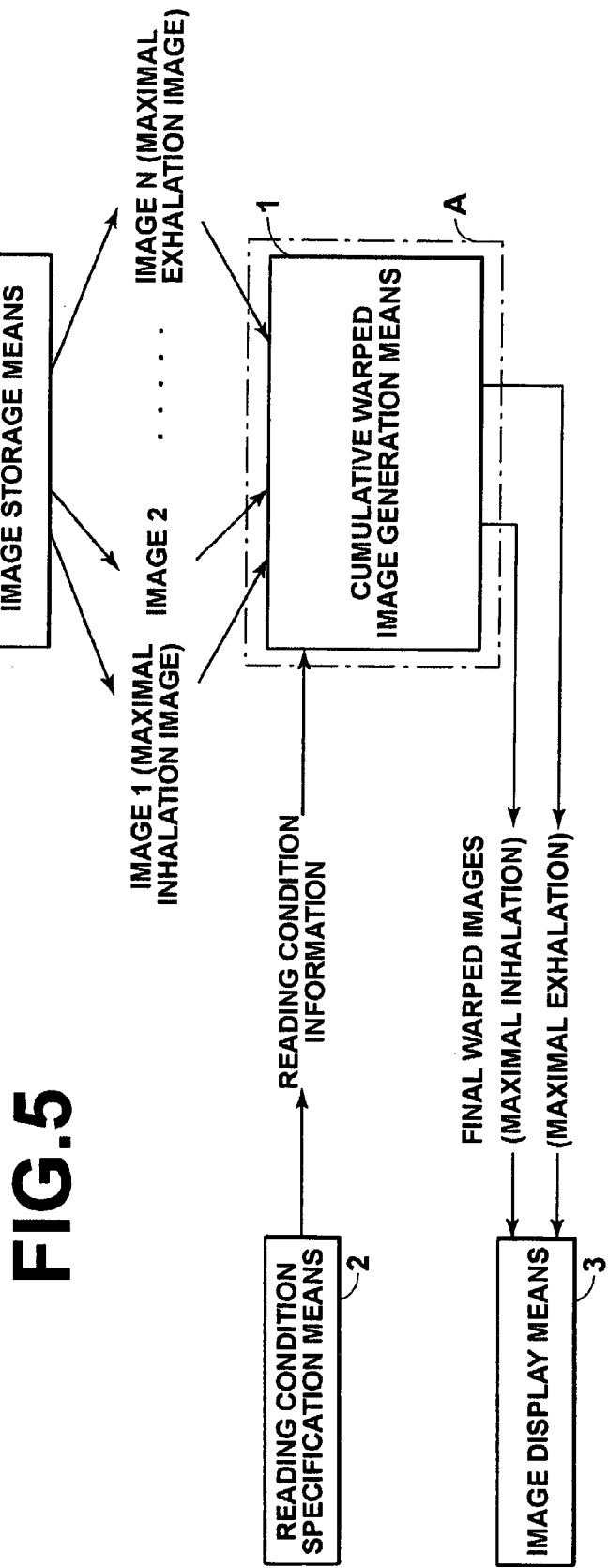
FIG. 5 is a block diagram showing the configuration of an image interpretation aiding apparatus A and a peripheral system and flows of data in a first embodiment of the present invention.

FIG. 5 is a block diagram showing the configuration of the image interpretation aiding apparatus A and a peripheral system and flows of data. As shown in FIG. 5, the image interpretation aiding apparatus A comprises cumulative warped image generation means 1. The cumulative warped image generation means 1 reads files of images 1 to N (where N represents the number of the images) stored in image storage means 4, according to reading condition information specified by the diagnostician with use of reading condition specification means 2. The cumulative warped image generation means 1 then generates the two final warped images by aligning the subject in the maximal inhalation image and the maximal exhalation image used as two observation images to the subject in the reference image, and sends the two final warped images in the form of two image files to image display means 3. The cumulative warped image generation means 1 is installed in the image storage server 11 of the image interpretation aiding system 10.

The cumulative warped image generation means 1 comprises a main storage for storing a program executable by the image storage server 11 and data and instructions used by a CPU or the program of the image processing server 11, frame memories for storing the images, an external storage such as a hard disc for storing the final warped images, interfaces for input/output and communication, and an operating system.

The reading condition specification means 2 is installed in the client PC 41, and comprises a main storage for storing a program executable by the client PC 41 and data and instructions used by a CPU or the program of the client PC 41, interfaces for input/output and communication, and an operating system.

The image display means 3 is installed in the image display system 40, and comprises a main storage for storing a program executable by the client PC 41 and data and instructions used by the CPU or the program of the client PC 41, frame memories for storing the images to be displayed, an external storage such as a hard disc for storing the images, the high-definition liquid crystal display devices 42 for displaying the images, interfaces for input/output and communication, and an operating system.

The reading condition information includes a patient ID for identifying the patient to be diagnosed, the date and time of photography, and a reading pattern for specifying a method of image processing and detailed settings. In this embodiment, the image processing server 11 is configured to carry out the image processing according to one of predetermined reading patterns that is specified by the diagnostician with use of the reading condition specification means 2.

The image storage means 4 is installed in the image management system 30, and comprises a main storage for storing a program executable by the image management server 31 and data and instructions used by a CPU or the program of the image management server 31, the large-capacity external storage 32 for storing image data in relation to accompanying information including the patient ID and the date and time of photography, interfaces for input/output and communication, and an operating system.

A procedure carried out in the image interpretation aiding apparatus A and the peripheral system will be described next.

In the image photography/reading system 20, the FPD apparatus 23 that can deal with a moving image photographs the chest of the patient, and the images 1 to N(N≧3) representing the different phases of respiratory cycle are generated. The images are related to the accompanying information such as the patient ID and the date and time of photography, and stored in the files. Therefore, the N image files are output, and sent to the image management system 30 via the network 50. In this embodiment, the maximal inhalation image (the image 1) and the maximal exhalation image (the image N) have been identified at the time of photography, and the accompanying information includes information for identifying the maximal inhalation image and the maximal exhalation image.

In the image management system 30, the image management server 31 receives the N image files sent from the image photography/reading system 20, and stores the image data in the N image files in relation to the accompanying information comprising the patient ID and the date and time of photography in the external storage 32, according to a data format and a data structure defined by the database management software. The image data can be searched for according to a search key using all or a part of the accompanying information.

The diagnostician specifies the accompanying information including the patient ID and the date and time of photography, and one of the reading patterns (comparison of the maximal inhalation image and the maximal exhalation image, in this case), by using the reading condition specification means 2. Therefore, the images to be used for comparative image reading are specified by the accompanying information, while the content of the image processing necessary for the comparative image reading is also specified by the specified reading pattern. More specifically, the diagnostician starts a program for specifying the reading condition information in the client PC 41, and inputs the accompanying information comprising the patient ID and the date and time of photography in a screen by using a mouse and a keyboard. The diagnostician also selects a desired one of the reading patterns in the screen. The reading condition specification means 2 sends the reading condition information to the image interpretation aiding system 10.

In the image interpretation aiding system 10, the image processing server 11 receives the reading condition information and analyzes the reading condition information. Since comparison of the maximal inhalation image and the maximal exhalation image has been selected as the reading pattern, the cumulative warped image generation means 1 carries out the image processing necessary for the comparative image reading.

Figure 6:
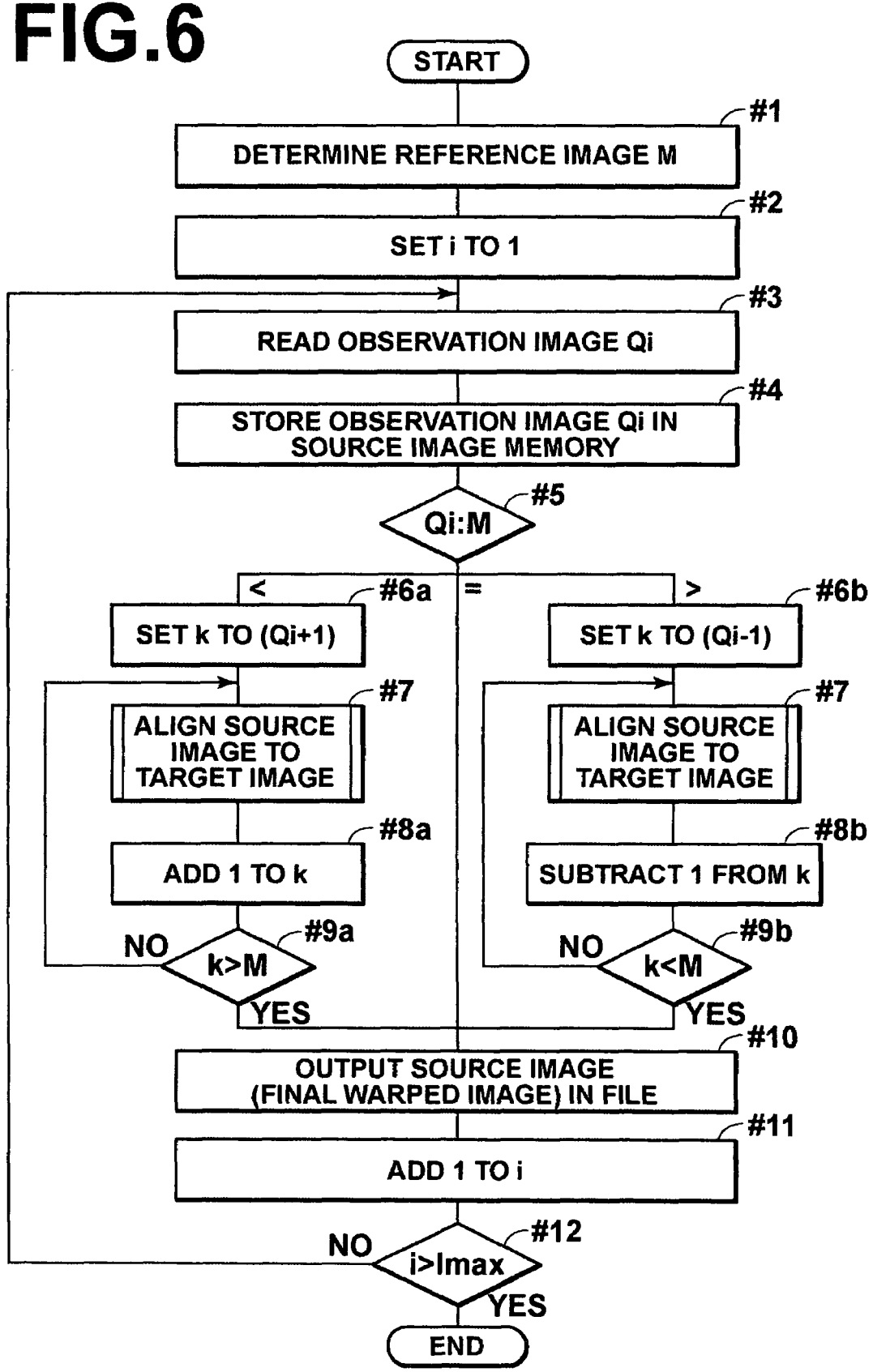
FIG. 6 is a flow chart showing a procedure carried out by cumulative warped image generation means in the first embodiment.
Figure 7:
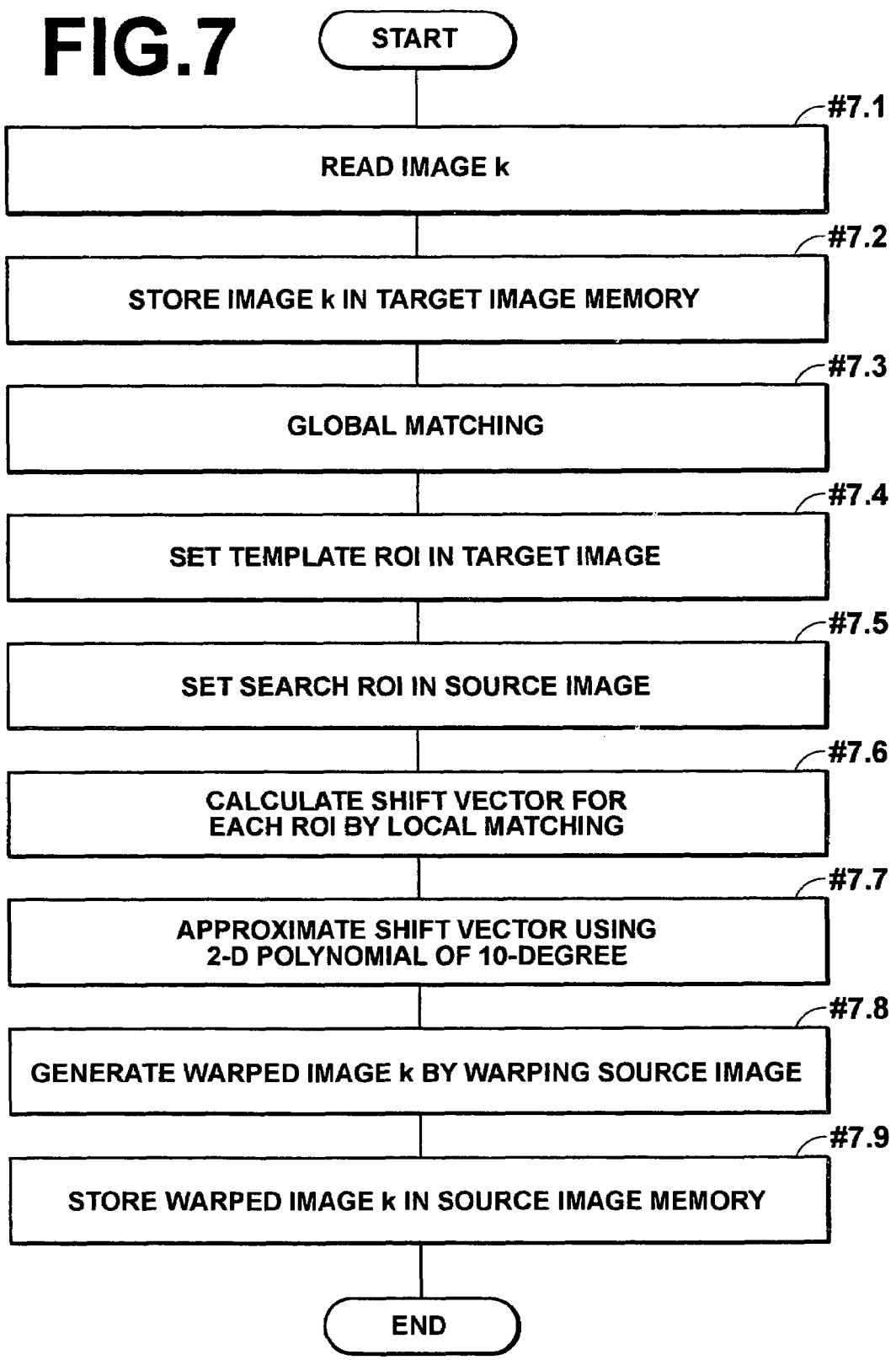
FIG. 7 is a flow chart showing a procedure carried out by the cumulative warped image generation means for aligning a source image to a target image.

A procedure carried out by the cumulative warped image generation means 1 will be described with reference to a flow chart in FIG. 6 showing an overall procedure carried out by the cumulative warped image generation means 1 and to a flow chart in FIG. 7 showing a procedure (the step shown by #7 in FIG. 6) for aligning a source image to a target image. In the description below, a source image memory and a target image memory are used as the frame memories. The images 1 to N are stored in the external storage 32 in the image management system 30 under control of the database management software running in the image management server 31. For reading the images, a reading request is sent from the image processing server 11 to the image management server 31 via the network 50, and the image management server 31 searches the database for the image data requested by the image processing server 11, based on the request. The image management server 31 sends the files having the image data therein to the image processing server 11 via the network 50, and the image processing server 11 reads the image data stored in the files sent thereto from the image management server 31. In this manner, the images are read. In the description below, this procedure is simply stated as "the images are read", for example.

A reference image M (where M represents a fixed image number) to be used as a reference for alignment is determined first (#1). The reference image M is determined in such a manner that repetition of generating warped images does not become uneven between the observation images and becomes minimal for each of the observation images. In this embodiment, the reference image M is determined to be located in the middle (represented by N/2 or (N±1)/2) of the observation images, that is, in the middle of the images 1 and N. In the description below, the reference image M is the image (N/2). Therefore, M=N/2.

One of the observation images is read and stored in the source image memory (#2~#4). Hereinafter, one of the observation images is referred to as an image Qi, and i=1 now. In this case, the observation image Q1 is the image 1 representing the maximal inhalation image (that is, Q1=1). The observation image 1 is read and stored in the source image memory (#2~#4).

The values of M and Q1 are then compared (#5). In this embodiment, Q1=1 and M=N/2. Therefore, Q1<M, since N≧3. Consequently, let a variable k representing an image number be Q1+1(=2) at the step shown as #6a. Thereafter, alignment processing is carried out (#7) for aligning the subject in the image represented by the image data stored in the source image memory (hereinafter referred to as a source image P2) to the subject in the target image represented by the image data that are stored in the target image memory as will be described below (hereinafter referred to as a target image P1).

In the alignment processing, the image k(=2) is read and stored in the target image memory (#7.1~#7.2).

Rough alignment of the source image P2 to the target image P1 (hereinafter referred to as global matching) is then carried out (#7.3). In the global matching, the source image P2 is subjected to affine transformation (rotation and translation) to be aligned to the target image P1. In this manner, the source image P2 is transformed into a transformed source image P2' shown in FIG. 8.

After completion of the global matching, local alignment processing (hereinafter referred to as local matching) is then carried out (#7.4~#7.7). The steps of the local matching will be described below.

A region of interest (hereinafter referred to as a template ROI(T)) is set in the target image P1. As shown in FIG. 9, the template ROI(T) is represented by coordinates (x, y) of a pixel at the center thereof (#7.4). A search ROI (hereinafter referred to as a search ROI(R)) is also set in the transformed source image P2' (#7.5) for the corresponding template ROI(T) of the target image P1. The search ROI(R) has the same coordinates (x, y) of the center pixel as the corresponding template ROI(T), but has a larger area than the corresponding template ROI(T). In this example, the search ROI(R) has an area 4 times larger (that is, two times larger in vertical and horizontal directions, respectively) than the corresponding template ROI(T).

While the corresponding template ROI(T) is moved within the search ROI(R) that has been set in the transformed source image P2', coordinates (x', y') of a position (the center of the moving ROI(T)) having the highest matching degree between the images P1 and P2' is found (calculation of a shift vector for each ROI by local matching; #7.6). This procedure is repeated at various positions of the ROI(T) shown by grid points in FIG. 12. As an index of representing the matching degree, a least square or an index of cross-correlation may be used, for example.

Figure 10:
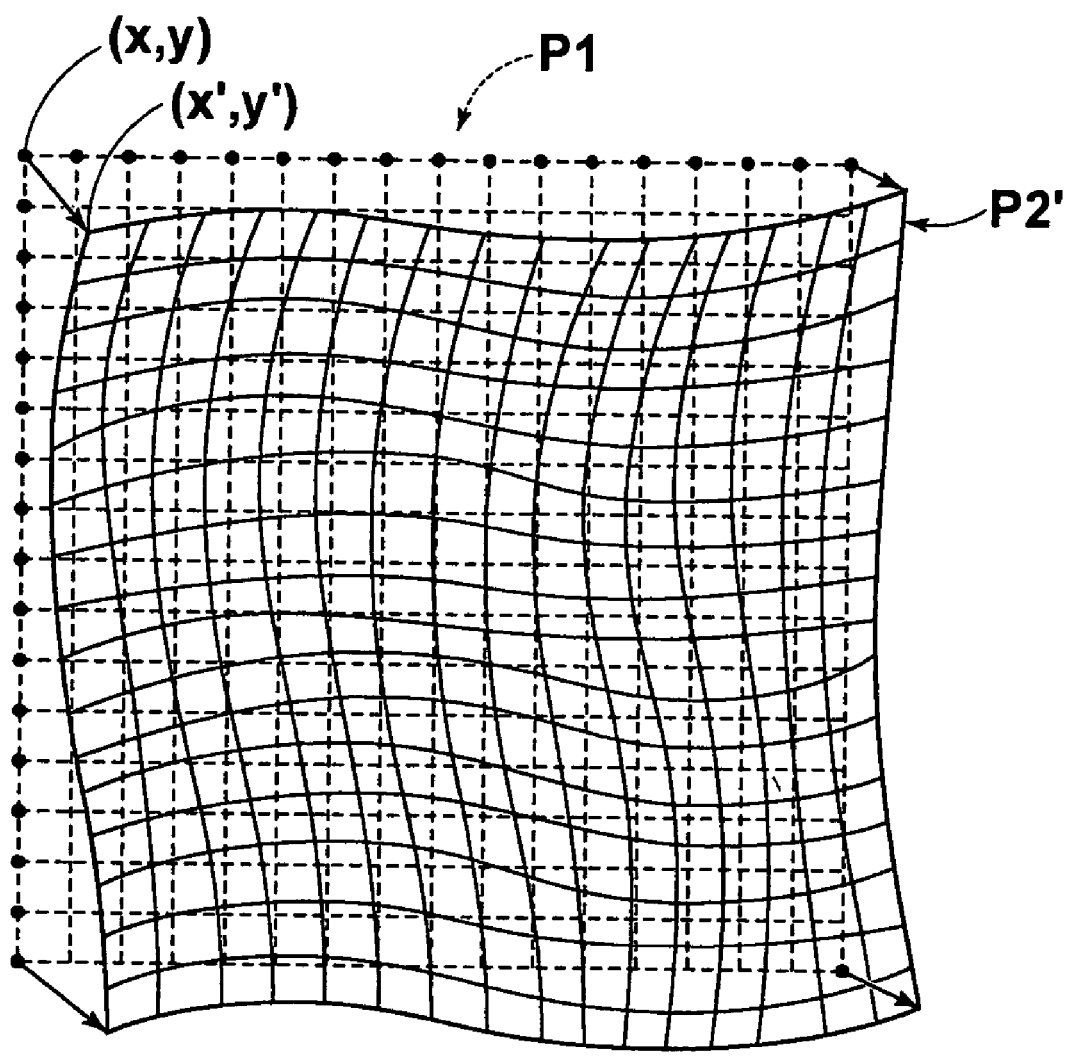
FIG. 10 is a diagram showing how the center pixel shifts in each ROI found by the local matching processing by the cumulative warped image generation means.

The shift vector represented by ($\Delta$x, $\Delta$y) found in the above manner (where $\Delta$x=x'−x, and $\Delta$y=y'−y) for the center pixel (x, y) in the search ROI(R) is as shown in the images P1 and P2' in FIG. 10. In order to find the shift vector ($\Delta$x, $\Delta$y) for each of the pixels in the transformed source image P2' by using the shift vector ($\Delta$x, $\Delta$y) for the corresponding center pixel, approximation is carried out according to a two-dimensional fitting polynomial of degree 10 (#7.7). The pixels in the transformed source image P2' are then subjected to warping wherein each of the pixels (x, y) in the transformed source image P2' is transformed by the corresponding shift vector ($\Delta$x, $\Delta$y) that has been calculated. In this manner, a warped image k is generated (#7.8).

According to the procedure described above, the warped image k (=2) is generated wherein the subject in the observation image Q1 (that is, the image 1) is aligned to the subject in the image k (=2) adjacent to the observation image Q1.

The warped image k (=2) is then stored in the source image memory (#7.9), and 1 is added to k. Therefore, k=3 (#8a). The values of k and M are then compared (#9a).

Figure 11:
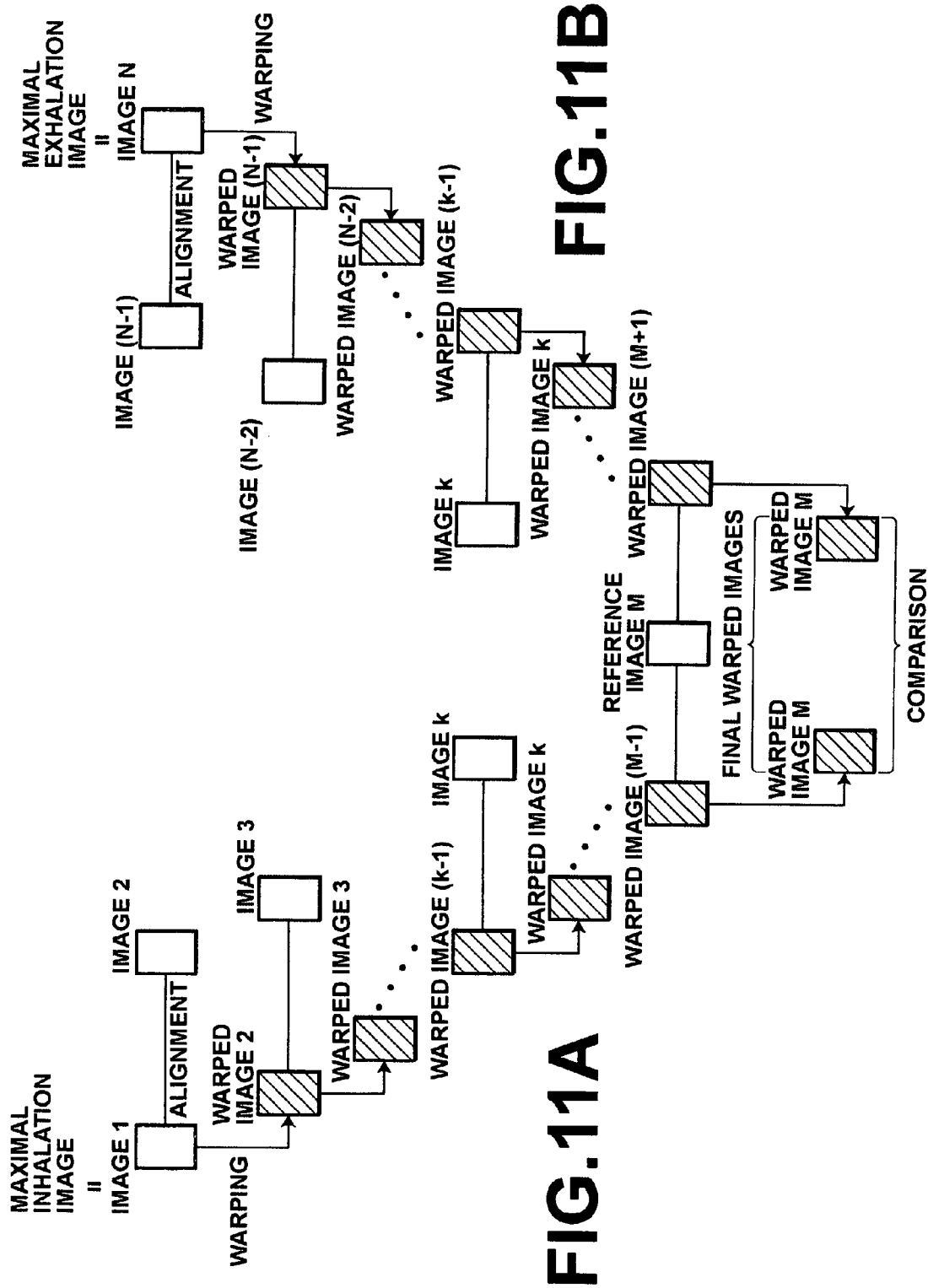
FIG. 11A is a diagram showing how the cumulative warped image generation means aligns a maximal inhalation image 1 to a reference image.
FIG. 11B is a diagram showing how the cumulative warped image generation means aligns a maximal exhalation image N to the reference image.

If k≦M, the alignment processing is repeated for aligning the source image to the target image (#7). In this description, since k=3, the image 3 is read (#7.1), and stored in the target image memory (#7.2). The same procedure (#7.3~#7.8) is carried out again, and a warped image k (=3) is generated wherein the subject in the source image P2 (the warped image 2) is aligned to the subject in the target image P1 (the image 3). Thereafter, the same alignment procedure is repeated while adding 1 to k at each repetition, and the subject in a warped image (k−1) is aligned to the subject in an image k, generating a warped image k (see FIG. 11A).

When k=M, the subject in a warped image (M−1) is aligned to the subject in the reference image M, and a warped image M is generated. Thereafter, 1 is added to k (#8a). Since k>M now (#9a), the warped image stored in the source image memory is output in the file as the final warped image (#10). The final warped image has the subject aligned to the subject in the reference image M.

Thereafter, 1 is added to i. Therefore, i=2 (#11). The value of i is compared with a value Imax representing the number of the observation images (#12). In this example, Imax=2. Therefore, the other observation image (hereinafter referred to as an image Q2) is read (#3), and stored in the source image memory (#4).

In this example, the observation image Q2 represents the image N (the maximal exhalation image). Therefore, Q2=N. When the value of Q2 is compared with the value of M (#5), Q2>M, since Q2=N and M=N/2. Therefore, let k be (Q2−1), that is, k=N−1 (#6b). The subject in the source image P2 is then aligned to the subject in the target image P1 (#7).

Therefore, the same procedure as for the observation image Q1 is carried out (#7.1~#7.9), and a warped image (N−1) is generated wherein the subject in the observation image Q2 is aligned to the subject in the image (N−1), and stored in the source image memory.

Thereafter, 1 is subtracted from k, and k=N−2 (#8b). The values of k and M are then compared (#9b).

If K≧M, the alignment processing is carried out for aligning the source image to the target image (#7). Since k=N−2 now, the image (N−2) is read (#7.1), and stored in the target image memory (#7.2). The same procedure (#7.3~#7.8) is then carried out and a warped image (N−2) is generated wherein the subject in the source image P2 (that is, the warped image (N−1)) is aligned to the subject in the target image P1 (that is, the image (N−2)). The alignment processing is repeated while subtracting 1 from k at each repetition, and a warped image k is generated by aligning the subject in a warped image (k+1) to the subject in an image k (see FIG. 11B).

When k=M, a warped image M is generated in the above-described manner by aligning the subject in a warped image (M+1) to the subject in the reference image M, and 1 is subtracted from k (#8b). At this time, k<M (#9b). Therefore, the warped image stored in the source image memory is output in the file as the other final warped image (#10). The final warped image was generated by aligning the subject in the observation image Q2 to the subject in the reference image M.

Thereafter, 1 is added to i. Therefore, i=3 (#11). The values of i and Imax are then compared (#12). In this case, Imax=2. Therefore, i>Imax, and the procedure ends.

As has been described above with reference to the flow charts, the cumulative warped image generation means 1 generates the final warped images for the maximal inhalation image and the maximal exhalation image, and outputs the files of the two final warped images. The two final warped image files are sent from the image processing server 11 to the client PC 41 in the image display system 40 via the network 50. In the client PC 41, the image display means 3 displays the two final warped images on two of the three high-definition liquid crystal display devices 42, based on the two final warped image files. In other words, the two images having been subjected to the alignment processing are displayed for representing the maximal inhalation image and the maximal exhalation image and provided to the diagnostician.

As has been described above, according to the image interpretation aiding apparatus A of the first embodiment, the cumulative warped image generation means 1 carries out the alignment processing wherein the subject in each of the observation images is aligned to the subject in the transitional image adjacent to the observation image, and generates the warped image. The cumulative warped image generation means 1 further carries out the alignment processing for aligning the subject in the warped image to the subject in the transitional image adjacent to the warped image, and generates the subsequent warped image. By repeating this procedure, the final warped images are generated through alignment of the subject in the observation images to the subject in the reference image. Therefore, the alignment can be carried out with high accuracy on the subject in the maximal inhalation image and the maximal exhalation image among the radiographs obtained by photography of the different phases of respiratory cycle as the two observation images that are important for diagnosis. Consequently, the diagnostician can easily interpret the two images through comparative image reading thereof, which improves effectiveness in diagnosis of respiratory abnormality.

Modifications of the first embodiment will be described next.

In the above description, the cumulative warped image generation means 1 generates the warped image every time the source image is aligned to the target image. However, in one of the modifications, this procedure of generating the warped image is not carried out. Instead, the warped image is generated only when the subject in the observation image is aligned to the subject in the reference image. More specifically, in the flow chart in FIG. 7, the step of generating the warped image k (#7.8) by warping the source image P2 and the step of storing the warped image k in the source image memory (#7.9) are not carried out. In this case, only the shift vector for each of the pixels is output through the approximation using the two-dimensional fitting polynomial of degree 10 (#7.7). In the alignment processing (#7) for aligning the source image P2 to the target image P1 after 1 is added to k (#8a, b), the steps of global matching and thereafter are carried out with the image k in the following manner, based on the source image P2 (that is, the observation image Qi) and the shift vector output through the approximation. When k>M or k<M (#9.a or #9.b), the subject in the observation image Qi is aligned to the subject in the reference image M, and the final warped image is generated to be output in the file, based on the source image P2 and the shift vector (#10). In this manner, the number of the warped images generated actually can be reduced, which improves processing efficiency.

In the above description, the final warped image is generated regarding the observation image Q1, and the final warped image is thereafter generated regarding the observation image Q2. In other words, the steps of alignment and warped image generation are carried out serially. However, in the case where the image processing server 11 is configured for enabling parallel processing, the steps of alignment and warped image generation are carried out in parallel. In this manner, the time necessary therefor can be shortened.

In the above description, the image processing server 11 carries out the procedure by receiving the images 1 to N from the image storage server 31. However, the images 1 to N may be received directly from the image photography/reading system 20. This manner is effective in the case where the comparative image reading is carried out at the time of photography. In addition, the final warped images may be sent to the image management server 31 instead of being sent to the client 41 so that the final warped images can be stored in the external storage 32 in relation to the accompanying information comprising the patient ID and the date and time of photography under management by the database management software in the image management server 31. In this manner, the diagnostician can make a reservation of the processing to be carried out on the images used in the comparative image reading, by using the reading condition specification means 2. Therefore, the diagnostician does not need to wait for the processing by the image processing server 11 at the time of the comparative image reading, and a load on the image processing server 11 is also reduced by causing the final warped images to be generated by the image processing server 11 in batch processing during nighttime, for example.

In the above description, the maximal inhalation image and the maximal exhalation image are identified at the time of photography, and the accompanying information includes the information for identifying the maximal inhalation image and the maximal exhalation image. However, the cumulative warped image generation means 1 may identify the maximal inhalation image and the maximal exhalation image from an average density or the like in the images.

In the above description, the cumulative warped image generation means 1 is installed in the image processing server 11 while the reading condition specification means 2 is installed in the client PC 41. In addition, the image display means 3 is installed in the client PC 41 and in the high-definition liquid crystal display devices 42, and the image storage means 4 is installed in the image management server 31 and in the external storage 32. However, the cumulative warped image generation means 1, the reading condition specification means 2, the image display means 3, and the image storage means 4 may be installed in one computer, which is efficient in the case of a small-sized system.

An image interpretation aiding apparatus B of a second embodiment of the present invention has a function of generating a subtraction image between the two final warped images generated by aligning the subject in the maximal inhalation image and the maximal exhalation image to the subject in the predetermined reference image.

Figure 12:
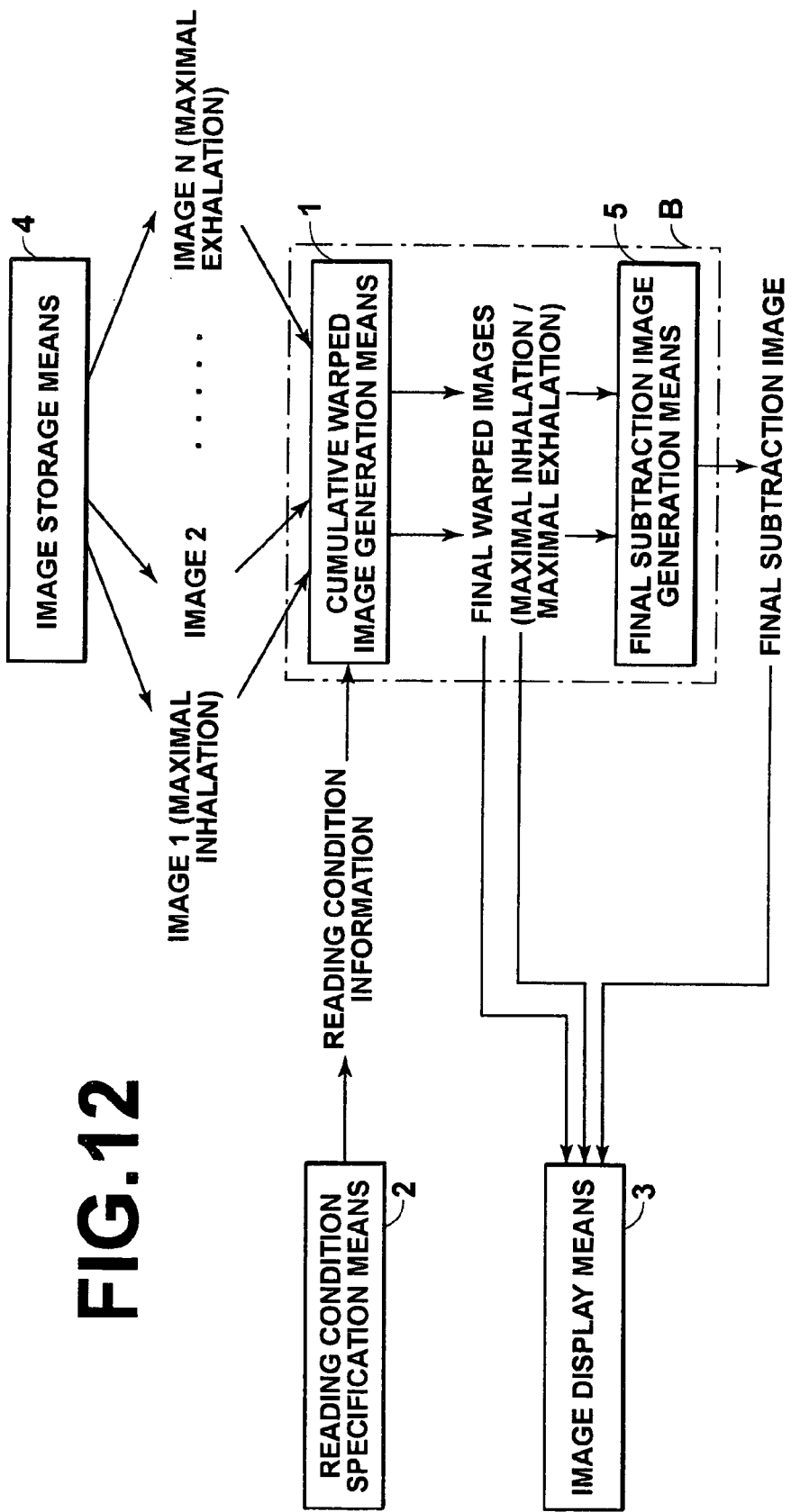
FIG. 12 is a block diagram showing the configuration of an image interpretation aiding apparatus B and a peripheral system and flows of data in a second embodiment of the present invention.

FIG. 12 is a block diagram showing the configuration of the image interpretation aiding apparatus B and a peripheral system and flows of data. The only difference between the image interpretation aiding apparatus B and the image interpretation aiding apparatus A is that the image interpretation aiding apparatus B has final subtraction image generation means 5 for generating the subtraction image. Hereinafter, this difference will be mainly described.

The final subtraction image generation means 5 comprises a main storage for storing a program executable by the image storage server 11 and data and instructions used by the CPU or the program of the image processing server 11, frame memories for image storage, an external storage such as a hard disc for storing the final subtraction image, interfaces for input/output and communication, and an operating system.

Figure 13:
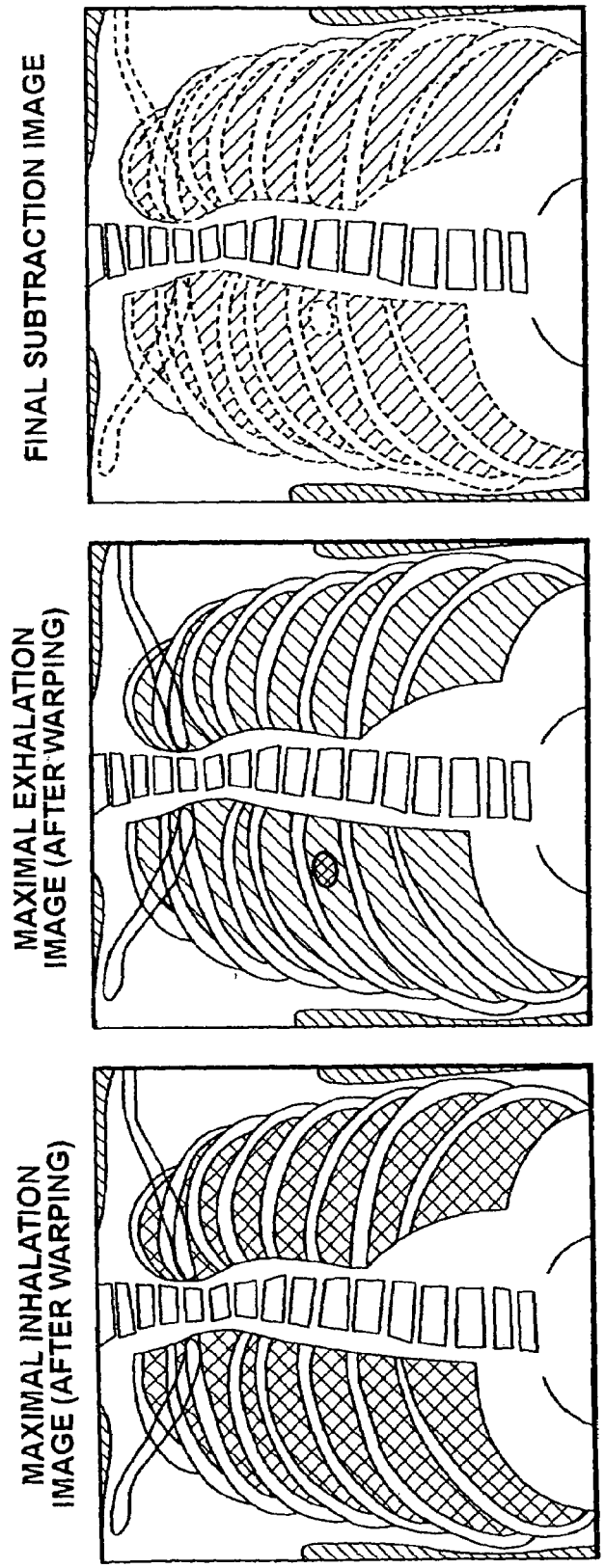
FIGS. 13A to 13C respectively show examples of two final warped images representing a maximal inhalation image and a maximal exhalation image, and a final subtraction image displayed on image display means in the second embodiment.

The final subtraction image generation means 5 reads the two final warped images generated by the cumulative warped image generation means 1, and generates the final subtraction image by carrying out subtraction processing between the corresponding pixels in the two final warped images. The final subtraction image is output in the form of a file (referred to as a final subtraction image file), and sent to the client PC 41 in the image display system 40 from the image processing server 11 via the network 50, together with the two final warped images generated by the final warped image generation means 1. In the client PC 41, the image display means 3 respectively displays the two final warped images representing the maximal inhalation image and the maximal exhalation image, and the final subtraction image on the three high-definition liquid crystal display devices 42, and provides the images to a diagnostician (see FIG. 13).

As has been described above, according to the image interpretation aiding apparatus B of the second embodiment, the final subtraction image generation means 5 generates the final subtraction image, based on the two final warped images generated by the cumulative warped image generation means 1 with high alignment accuracy. Therefore, an artifact in the final subtraction image is suppressed and the diagnostician can easily carry out comparative image reading. Consequently, clearer diagnosis of respiratory abnormality can be carried out. More specifically, if respiration is carried out normally, air goes out of lung fields by exhalation after inhalation, and absorption of X-rays in the lung fields becomes larger. Therefore, density changes in the lung fields between the maximal inhalation image and the maximal exhalation image, and the change appears in the final subtraction image. However, if an area of respiratory abnormality exists, air does not go out from the area even in exhalation, and absorption of X-rays remains small. Therefore, the density does not change greatly in the area, and the area appears conspicuously in the final subtraction image. Consequently, the area can be detected as an abnormal respiration area.

The final warped images are exchanged in the form of the files, between the final subtraction image generation means and the cumulative warped image generation means 1. However, the images may be exchanged between the final subtraction image generation means 5 and the cumulative warped image generation means 1 via the frame memories if the frame memories are shared by the final subtraction image generation means 5 and the cumulative warped image generation means 1.

The image display means 3 may display only the final subtraction image on one of the high-definition liquid crystal display devices 42. Alternatively, the original maximal inhalation image and the original maximal exhalation image may be displayed instead of the final warped images.

An image interpretation aiding apparatus C of a third embodiment of the present invention has a function of generating a map image enabling recognition of segments in the final subtraction image by classifying pixel values in the final subtraction image into the segments according to one or more threshold values.

Figure 14:
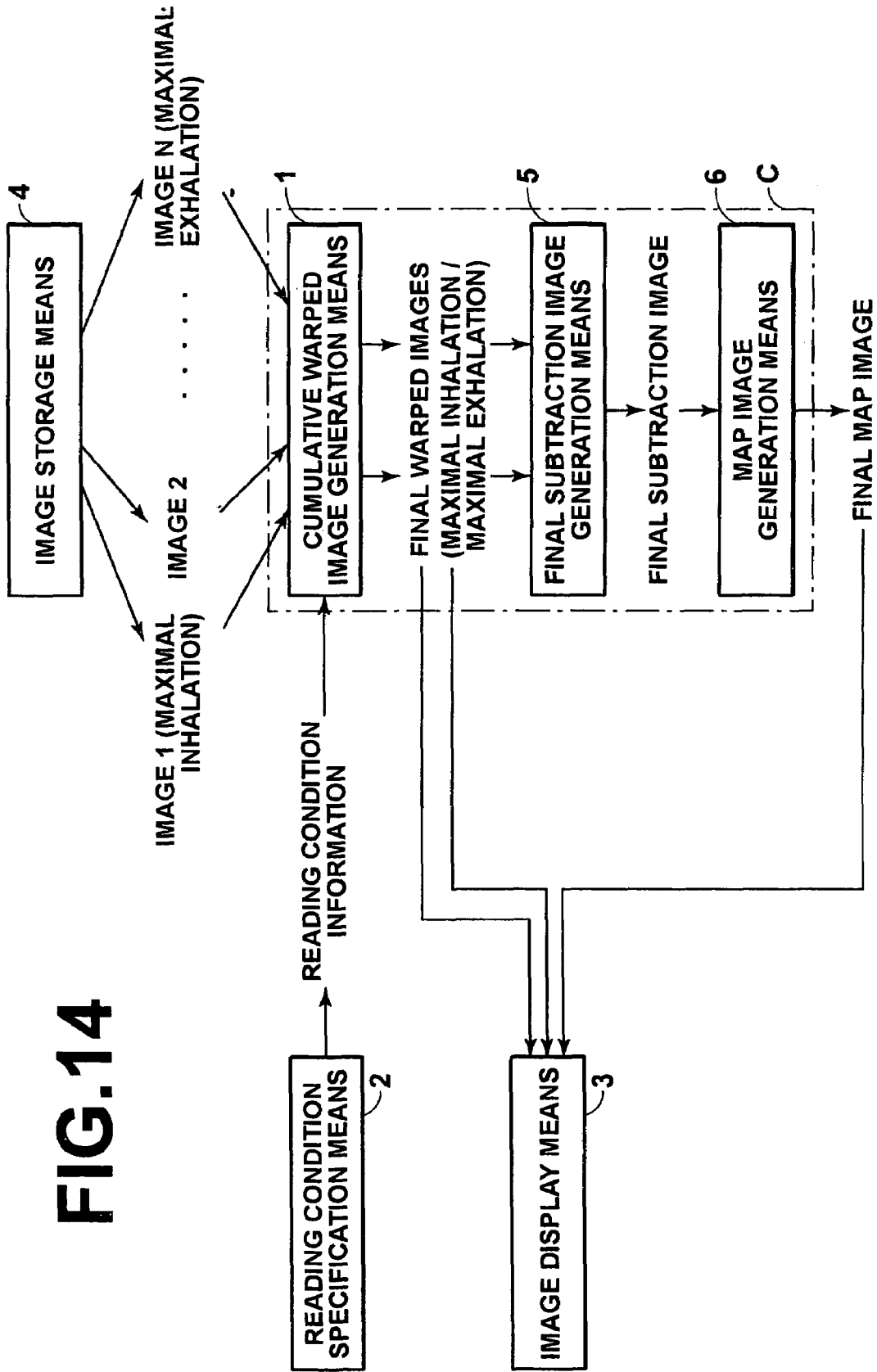
FIG. 14 is a block diagram showing the configuration of an image interpretation aiding apparatus C and a peripheral system and flows of data in a third embodiment of the present invention.

FIG. 14 is a block diagram showing the configuration of the image interpretation aiding apparatus C and a peripheral system, and flows of data. The only difference between the image interpretation aiding apparatus C and the image interpretation aiding apparatus B is that the image interpretation aiding apparatus C has map image generation means 6 for generating a final map image by carrying out thresholding or the like on the final subtraction image. Hereinafter, this difference will be described mainly.

The map image generation means 6 comprises a main storage for storing a program executable by the image storage server 11 and data and instructions used by the CPU or the program of the image processing server 11, a frame memory for image storage, an external storage such as a hard disc for storing the final subtraction image, interfaces for input/output and communication, and an operating system.

The map image generation means 6 reads the final subtraction image generated by the final subtraction image generation means 5, and extracts an area of rib cage through rib cage detection processing (see Japanese Unexamined Patent Publications No. 2002-109548 and 2002-109550, for example). The map image generation means 6 divides the area in the rib cage into blocks of a predetermined size (such as 36×36 pixels), and generates a local average image by finding an average pixel value in each of the blocks. The map image generation means 6 carries out the thresholding on the local average image by using one or more of pixel values as the threshold value or values, and divides the local average image into the two or more segments. The map image generation means 6 then generates the final map image wherein each of the blocks in the local average image can be recognized by assigning different colors thereto, for example. The final map image is output in the form of a file (called a final image file), and sent from the image processing server 11 to the client PC 41 in the image display system 40 via the network 50, together with the two final warped images generated by the cumulative warped image generation means 1. In the client PC 41, the image display means 3 respectively displays the two final warped images representing the maximal inhalation image and the maximal exhalation image, and the final map image on the three high-definition liquid crystal display devices 42, and provides the images to a diagnostician (see FIG. 18).

As has been described above, according to the image interpretation aiding apparatus C of the third embodiment, the map image generation means 6 generates the map image, based on the final subtraction image. Therefore, a density change in lung fields between the final warped images regarding the maximal inhalation image and the maximal exhalation image can be visualized. Consequently, an area of respiratory abnormality, where the density changes, can be found more easily.

The final subtraction image is exchanged in the form of the file, between the final subtraction image generation means 5 and the map image generation means 6. However, the final subtraction image may be exchanged between the final subtraction image generation means 5 and the map image generation means 6 via the frame memory if the frame memory is shared by the final subtraction image generation means 5 and the map image generation means 6.

The image display means 3 may display only the final map image alone on one of the high-definition liquid crystal display devices 42. Alternatively, the image display means 3 may display the original maximal inhalation image and the original maximal exhalation image instead of the final warped images. In addition, the image display means 3 may also display the final subtraction image.

An image interpretation aiding apparatus D of a fourth embodiment of the present invention has a function of generating map images. The image interpretation aiding apparatus D firstly generates the final warped images by aligning the subject in each of the original images to the subject in the reference image, and generates subtraction images between one of the final warped images as a reference subtraction image and the remaining final warped images. The image interpretation aiding apparatus D then classifies pixel values in the subtraction images into segments according to one or more threshold values, and generates the map images in which the segments in the subtraction images can be recognized.

Figure 15:
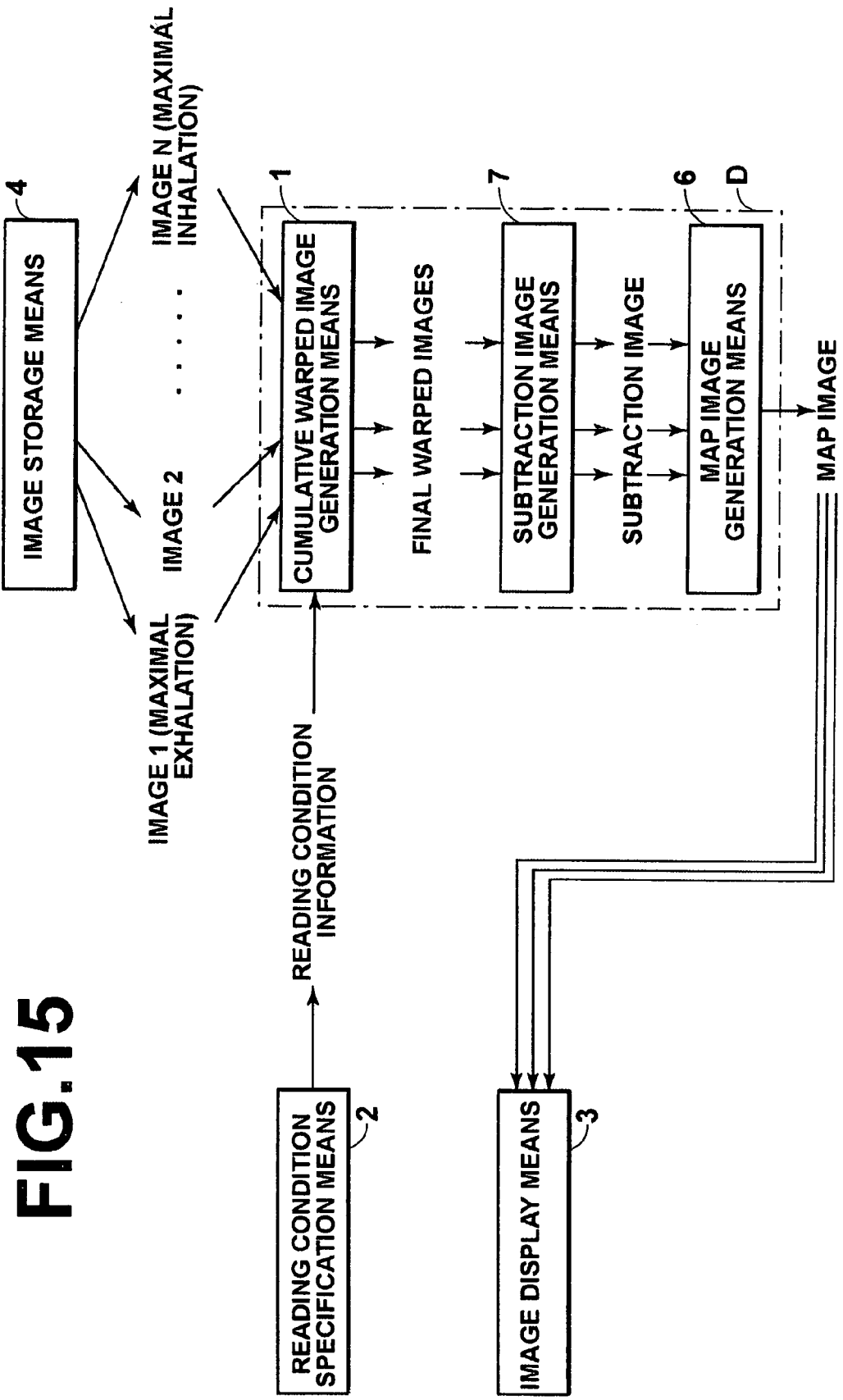
FIG. 15 is a block diagram showing the configuration of an image interpretation aiding apparatus D and a peripheral system and flows of data in a fourth embodiment of the present invention.

FIG. 15 is a block diagram showing the configuration of the image interpretation aiding apparatus D and a peripheral system, and flows of data. In this case, the cumulative warped image generation means 1 generates the final warped images for all the images 1 to N, which is different from the image interpretation aiding apparatus C. Furthermore, the image interpretation aiding apparatus D comprises subtraction image generation means 7 instead of the subtraction image generation means 5 in FIG. 14, for generating the subtraction images according to differences between the reference subtraction image and the remaining final warped images, which is also different from the image interpretation aiding apparatus C. Only the map images are sent to the image display means 3, which is another difference from the image interpretation aiding apparatus C.

The subtraction image generation means 7 comprises a main storage for storing a program executable by the image storage server 11 and data and instructions used by the CPU or the program of the image processing server 11, frame memories for image storage, an external storage such as a hard disc for storing the subtraction images, interfaces for input/output and communication, and an operating system.

A procedure carried out in the image interpretation aiding apparatus D and the peripheral system will be described next.

The N(N≧3) image files of the images 1 to N (wherein the image 1 represents a maximal exhalation image and the image N represents a maximal inhalation image) obtained by photography of a subject by the image photography/reading system 20 for representing the different phases of respiratory cycle are sent to the image management system 30 via the network 50, and stored in the external storage 32 in the image management system 30, in the same manner as the embodiments described above.

A diagnostician specifies "interpretation of difference map image with reference to maximal exhalation image" as the reading pattern, in addition to the accompanying information such as the patient ID and the time and date of photography, by using the reading condition specification means 2. The reading condition specification means 2 sends the reading condition information that has been input and selected to the image interpretation aiding system 10.

In the image interpretation aiding system 10, the image processing server 11 receives the reading condition information. Based on the specification of the reading pattern (that is, interpretation of difference map image with reference to maximal exhalation image), the cumulative warped image generation means 1 carries out image processing necessary therefor. The cumulative warped image generation means 1 is instructed to use all the images 1 to N as the observation images, which is different from the image interpretation aiding apparatus A that uses only the maximal inhalation image and the maximal exhalation image as the two observation images.

Figure 16A:
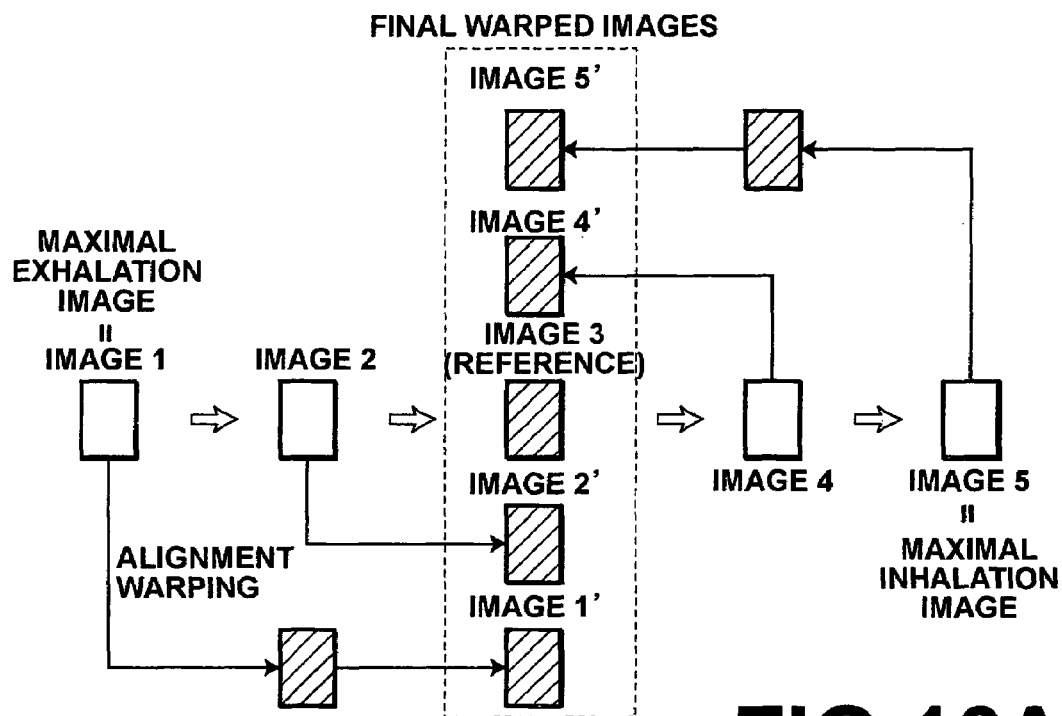
FIG. 16A shows how the cumulative warped image generation means generates final aligned images from 5 images.

The cumulative warped image generation means 1 carries out the alignment processing wherein the subject in all the images 1 to N as the observation images is aligned to the subject in the reference image M, in the same manner as the image interpretation aiding apparatus A. The cumulative warped image generation means 1 therefore generates final warped images 1 to N, and outputs the final warped images 1 to N in the form of N image files. This process corresponds to the case where Imax=N, Q1=1, Q2=2, . . . and QN=N in FIG. 6. FIG. 16A shows an example of generating 5 final warped images in the case where N=5 and the image 3 is used as the reference image.

Figure 17:
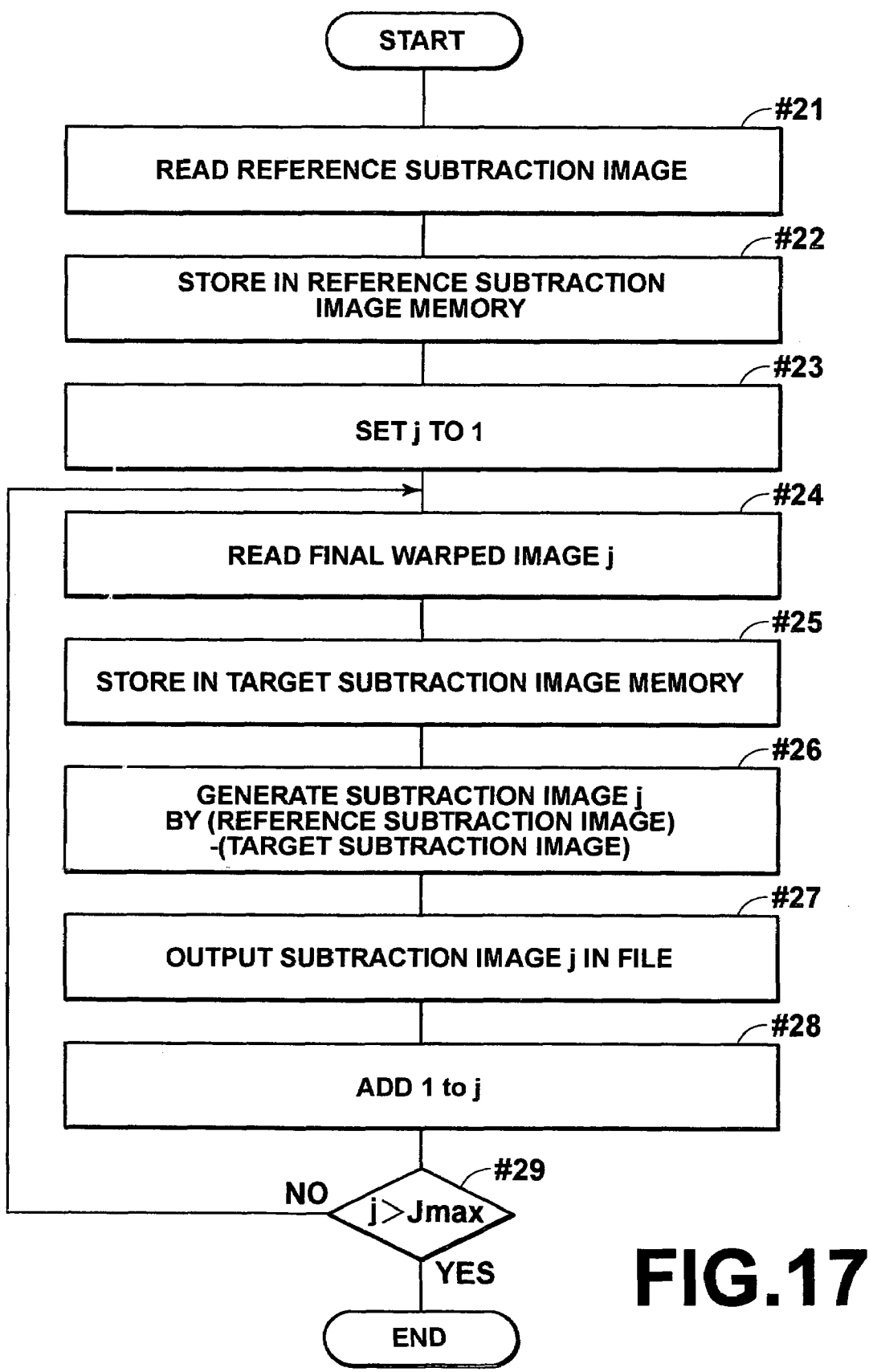
FIG. 17 is a flow chart showing a procedure carried out by subtraction image generation means.
Figure 18A:
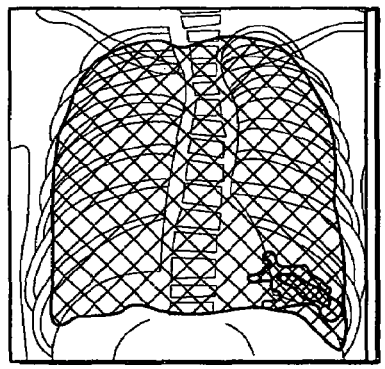
FIGS. 18A to 18(d) show four examples of map images generated by map image generation means in the fourth embodiment.
Figure 18B:
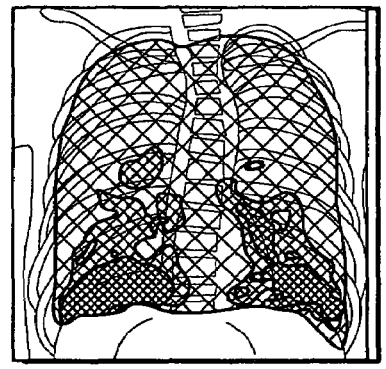
Figure 18C:
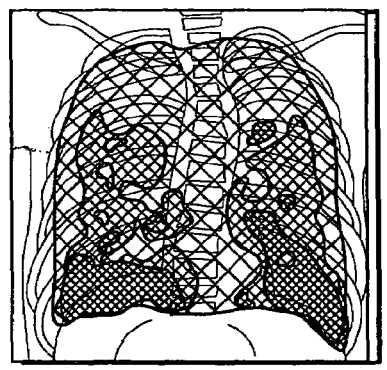
Figure 18D:
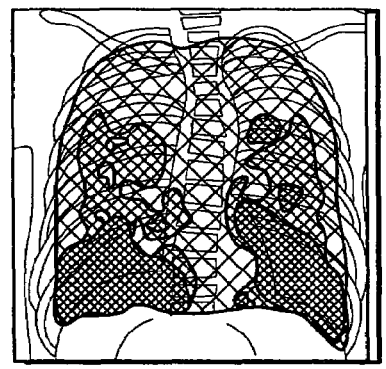

A procedure carried out by the subtraction image generation means 7 will be described next with reference to FIG. 17. In the procedure below, two frame memories, namely a reference subtraction image memory and a target subtraction image memory, are used. The final warped images to be input are read by the image management server 31 through reading of the image data in the final warped image files generated and output by the cumulative warped image generation means 1. Hereinafter, the reading is simply expressed as "the final warped images are read", for example.

Figure 16B:
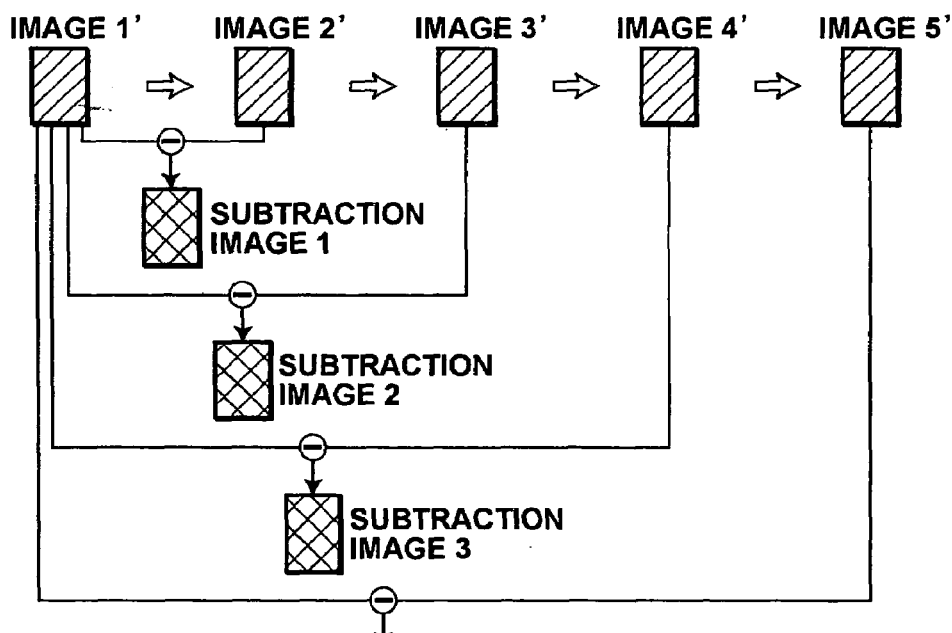
FIG. 16B shows how the cumulative warped image generation means generates final subtraction images between one of the final aligned images and the remaining final aligned images, in the fourth embodiment of the present invention.

The subtraction image generation means 7 reads the reference subtraction image (#21), and stores the reference subtraction image in the reference subtraction image memory (#22). In this embodiment, since the reading pattern has been specified as "interpretation of difference map image with reference to maximal exhalation image", the reference subtraction image is the final warped image generated from the maximal exhalation image (that is, the image 1). Therefore, let a variable j be 1 for representing an image number of the final warped image (#23). The final warped image j (=1) is then read (#24), and stored in the target subtraction image memory (#25). By carrying out subtraction processing between pixels corresponding to each other in the two images stored in the two image memories, a subtraction image j is generated (#26), and output in the form of a file (#27). Hereinafter, the file is called the subtraction image file j. After the output of the subtraction image file j, 1 is added to j (#28). If j is equal to or smaller than the number (denoted by Jmax) of the target subtraction images (in this case, Jmax=N), the procedure from reading the final warped image j (#24) and to output of the subtraction image j (#27) is repeated (#28) while adding 1 to j at each repetition. If j>Jmax, the procedure ends. In this manner, the subtraction images 1 to (N−1) are generated and output in the files, based on the differences between the final warped images 2 to N and the final warped image based on the maximal exhalation image 1. FIG. 16B shows an example for the case of N=5. In FIG. 16B, the subtraction images 1 to 4 are generated from the differences between the final warped images 2 to 5 and the final warped image 1 generated from the maximal exhalation image 1.

The map image generation means 6 sequentially reads the subtraction images 1 to (N−1) generated by the subtraction image generation means 7, and detects the area of rib cage in each of the subtraction images according to rib cage detection processing (see Japanese Unexamined Patent Publications No. 2002-109548 and 2002-109550, for example) The map image generation means 6 then divides the area into the blocks of the predetermined size (such as 36×36 pixels). The map image generation means 6 then generates the local average image by finding the average pixel value in each of the blocks. The map image generation means 6 carries out the thresholding on the local average image by using one or more threshold values, and divides the local average image into the two or more segments. The map image generation means 6 then generates the map image that enables recognition of the segments in the local average image by using colors different between the respective segments, for example. The map images generated from the respective subtraction images in the above manner are output in the form of files. FIG. 18 shows an example of the map images in the case where N=5. In FIG. 18 are shown the map images generated from the subtraction images 1 to 4 obtained by the differences between the final warped image 1 and the remaining final warped images. The (N−1) image files output in this processing (hereinafter referred to as the map image files) are sent from the image processing server 11 to the client PC 41 in the image display system 40 via the network 50. In the client PC 41, the image display means 3 displays the map images in order of interval change on the high-definition display devices 42, based on the (N−1) map image files, and provides the images to the diagnostician.

As has been described above, according to the image interpretation aiding apparatus D of the fourth embodiment, the cumulative warped image generation means 1 generates the final warped images based on the images starting from the maximal exhalation image and ending in the maximal inhalation image, and the subtraction image generation means 7 generates the subtraction images based on the differences between the final warped image generated from the maximal exhalation image as the reference and the remaining final warped images. The map image generation means 6 then generates the map images of the subtraction images. Therefore, the diagnostician can observe a state of inhalation of air into lung fields and a state of exhalation of air from the lung fields in a visually easy manner. Therefore, an area of abnormal respiration wherein density does not change greatly can be found more easily.

The final warped images are exchanged in the form of the files, between the subtraction image generation means 7 and the cumulative warped image generation means 1. In addition, the subtraction images are exchanged between the subtraction image generation means 7 and the map image generation means 6. However, the final warped images and the subtraction images may be exchanged between the corresponding means via the frame memories if the frame memories are shared between the corresponding means.

The client PC 41 of the image display system 40 may receive the files of the final warped images representing the maximal exhalation image and the maximal inhalation image from the image processing server 11 so that the image display means 3 can display the final warped images of the maximal exhalation image and the maximal inhalation image on two of the high-definition liquid crystal display devices 42 and can display the map images in the form of a moving image on the remaining display device 42.

An image interpretation aiding apparatus E of a fifth embodiment of the present invention has a function of generating two final warped images by aligning a subject in a maximal inhalation image and a maximal exhalation image to the subject in a predetermined reference image, by using soft-tissue images generated by an energy subtraction method. A diagnostician can interpret the two final warped images through comparative image reading thereof.

Figure 19:
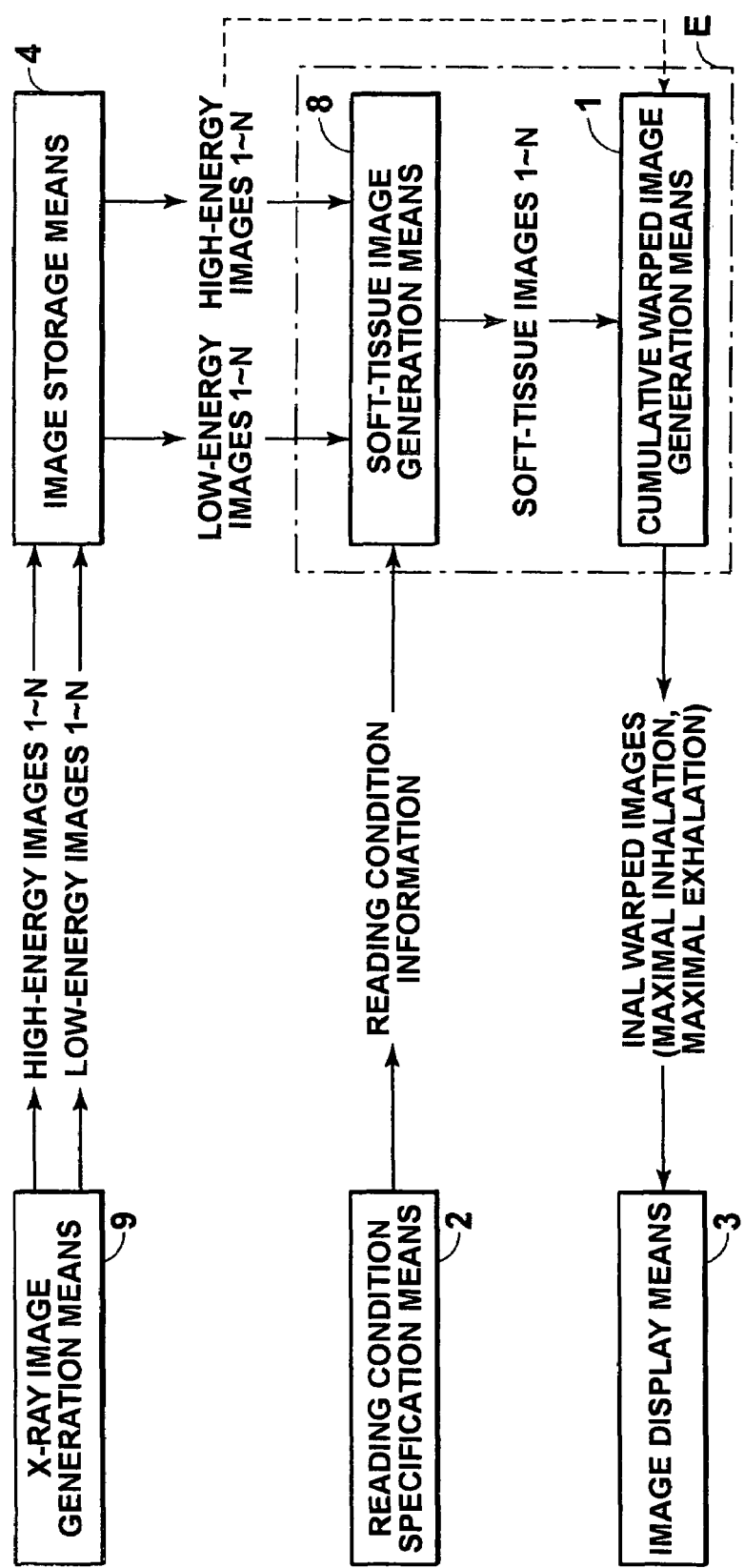
FIG. 19 is a block diagram showing the configuration of an image interpretation aiding apparatus E and a peripheral system and flows of data in a fifth embodiment of the present invention.

FIG. 19 is a block diagram showing the configuration of the image interpretation aiding apparatus E and a peripheral system and flows of data. As shown in FIG. 19, the image storage means 4 in the image management system 30 stores images representing different respiratory states. The images comprise high-energy images 1 to N (wherein the image 1 represents a maximal inhalation image and the image N represents a maximal exhalation image) and low-energy images 1 to N (wherein the image 1 represents a maximal inhalation image and the image N represents a maximal exhalation image) photographed by X-ray image generation means 9 in the image photography/reading system 20. The image interpretation aiding apparatus E comprises soft-tissue image generation means 8 for generating soft-tissue images 1 to N regarding the different respiratory states by reading files of the high-energy images 1 to N and the low-energy images 1 to N stored in the image storage means 4, based on the reading condition information specified by the diagnostician with use of the reading condition specification means 2. The cumulative warped image generation means 1 generates the two final warped images by aligning the subject in the soft-tissue images representing the maximal inhalation image and the maximal exhalation image as two observation images to the subject in the reference image, and sends the two final warped images in the form of files to the image display means 3. The soft-tissue image generation means 8 and the cumulative warped image generation means 1 are installed in the image processing server 11 in the image interpretation aiding system 10.

The soft-tissue image generation means 8 comprises a main storage for storing a program executable by the image processing server 11 and data and instructions used by the CPU or the program of the image processing server 11, frame memories for image storage, an external storage such as a hard disc for storing the final warped images, interfaces for input/output and communication, and an operating system.

The X-ray image generation means 9 is installed as the CR apparatus 21 that is an X-ray imaging apparatus (not shown in FIG. 19) in the image photography/reading system 20.

A procedure carried out in the image interpretation aiding apparatus E and the peripheral system will be described next.

The X-ray image generation means 9 photographs the chest of a patient by using different tube voltages, and generates the high-energy images 1 to N and the low-energy images 1 to N representing the different respiratory states. A method of generating the high-energy images and the low-energy images may be a conventional method such as those disclosed in Japanese Unexamined Patent Publications No. Hei 11(1999)-205682 and 2000-60834. Each of the high-energy images and the low-energy images is related to the accompanying information such as the patient ID and the date and time of photography, and output in the file. Therefore, 2N files are output. The 2N files are sent to the image management system 30 via the network 50. In this embodiment, the maximal inhalation images and the maximal exhalation images are identified at the time of photography, and the information for identifying those images is also included in the accompanying information.

In the image management system 30, the image management server 31 receives the 2N files, and stores the image data in the 2N files in the external storage 32 in relation to the accompanying information according to a data structure and a data format determined by the database management software. The image data can be searched for according to a search key using all or a part of the accompanying information.

The diagnostician inputs the accompanying information including the patient ID and the date and time of photography, and specifies the reading pattern (comparison of maximal inhalation soft-tissue image and maximal exhalation soft-tissue image, in this case) by using the reading condition specification means 2, and the reading condition specification means 2 sends the reading condition information to the image interpretation aiding system 10.

In the image interpretation aiding system 10, the image processing server 11 receives the reading condition information, and analyzes the content thereof. In this case, since the reading pattern specifies "comparison of maximal inhalation soft-tissue image and maximal exhalation soft-tissue image", the soft-tissue image generation means 8 carries out processing necessary therefor.

The soft-tissue image generation means 8 sequentially reads the high-energy images 1 to N and the low-energy images 1 to N for the respective respiratory states, and generates the soft-tissue images 1 to N by carrying out weighted subtraction on each pair of the high and low energy images having different energy distributions but representing the same respiratory state, that is, on a pair of the high-energy image 1 and the low energy image 1, a pair of the high-energy image 2 and the low-energy image 2, and so on. The soft-tissue images 1 to N are output in the form of files. A method of generating the soft-tissue images may be a conventional method such as those disclosed in Japanese Unexamined Patent Publications No. Hei 11(1999)-205682 and 2000-60834.

The cumulative warped image generation means 1 generates the two final warped images by aligning the subject in the soft-tissue images 1 and N respectively representing the maximal inhalation image and the maximal exhalation image to the subject in the reference image M, by using the soft-tissue images 1 to N in the same manner as the image interpretation aiding apparatus A. The two final warped images are output in the form of files, and sent from the image processing server 11 to the client PC 41 in the image display system 40 via the network 50. In the client PC 41, the image display means 3 displays the final warped images, that is, the aligned soft-tissue images representing the maximal inhalation image and the maximal exhalation image on two of the three high-definition liquid crystal display devices 42, based on the two final warped image files. The images are provided to the diagnostician.

As has been described above, according to the image interpretation aiding apparatus E of the fifth embodiment, the soft-tissue image generation means 8 generates the soft-tissue images from the radiographs obtained by photography of the different phases of respiratory cycle, and uses the soft-tissue images as an input for the alignment processing. Therefore, even in the case where ribs move to a direction different from the soft tissue at the time of photography due to a three-dimensional body movement of the subject, the soft tissue can be aligned and an effect caused by the movement of the ribs can be removed. In this manner, accuracy of soft-tissue alignment can be improved and a density change in lung fields can be observed easily.

The cumulative warped image generation means 1 may generate only the alignment result information (the shift vector for each of the pixels) instead of generating the warped images from the soft-tissue images. In this case, the cumulative warped image generation means 1 applies to the original images (the high-energy images) all the alignment result information for aligning the observation images Qi to the reference image M, and generates the final warped images based on the original images. Alignment of the soft-tissue images is less affected by the three-dimensional movement of the ribs than alignment of the original images. Therefore, accuracy of the alignment can be improved. However, image processing for generating the soft-tissue images may increase noise. Therefore, image reading can be carried out with high accuracy if the alignment result information obtained from the soft-tissue images having high accuracy is used as the alignment result information while the final warped images are generated from the original images having less noise.

The image interpretation aiding apparatus E may also comprise the final subtraction image generation means 5 as in the image interpretation aiding apparatus B. Alternatively, the image interpretation aiding apparatus E may also comprise the final subtraction image generation means 5 and the map image generation means 6 as in the image interpretation aiding apparatus C. In addition, the image interpretation aiding apparatus E may also comprise the subtraction image generation means 7 and the map image generation means 6, as in the image interpretation aiding apparatus D.

An image interpretation aiding apparatus F in a sixth embodiment of the present invention has a function of generating local movement images. The image interpretation aiding apparatus F finds a local displacement vector for each of local areas, based on a pixel displacement vector representing direction and magnitude of movement of each of pixels obtained through the alignment processing, and generates the local movement images having the local displacement vectors represented therein.

Figure 20:
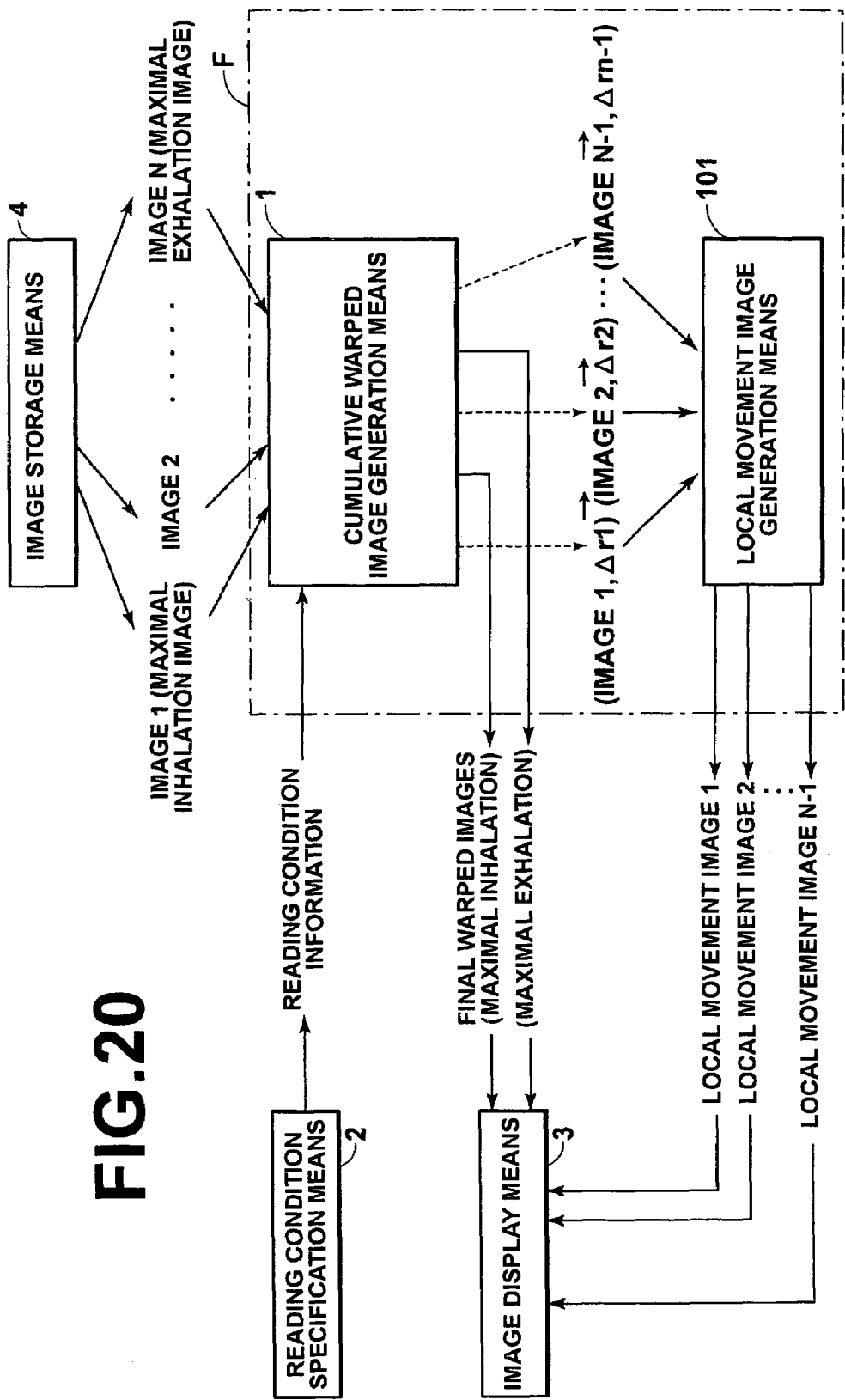
FIG. 20 is a block diagram showing the configuration of an image interpretation aiding apparatus F and a peripheral system and flows of data in a sixth embodiment of the present invention.

FIG. 20 is a block diagram showing the configuration of the image interpretation aiding apparatus F and a peripheral system, and flows of data. The image interpretation aiding apparatus F comprises local movement image generation means 101, which is different from the image interpretation aiding apparatus A. The local movement image generation means 101 generates the local movement images, based on pixel displacement vectors $\Delta r1$ to $\Delta rn-1$ corresponding to pixels in each of images 1 to (N−1) and an adjacent one of the images.

The local movement image generation means 101 comprises a program executable by the image processing server 11, a main storage for storing data and instructions used by the CPU and the program of the image processing server 11, frame memories for image storage, an external storage such as a hard disc for storing final subtraction images, interfaces for input/output and communication, and an operating system.

A procedure carried out by the image interpretation aiding apparatus F and the peripheral system will be described next.

The $N(N \leq 3)$ files of the images 1 (the maximal exhalation image) to N (the maximal inhalation image) photographed by the image photography/reading system 20 for representing the different respiratory states of the subject are sent to the image management system 30 via the network 50, and stored in the large-capacity external storage 32 in the image management system 30, in the same manner as the embodiments described above.

A diagnostician inputs the accompanying information such as the patient ID and the time and date of photography, and selects "local movement image reading" from the reading patterns, by using the reading condition specification means 2. The reading condition specification means 2 sends the reading condition information that has been input and selected to the image interpretation aiding system 10.

In the image interpretation aiding system 10, the image processing server 11 receives the reading condition information, and the cumulative warped image generation means 1 carries out processing necessary for the reading, according to the reading pattern (local movement image reading). The cumulative warped image generation means 1 is instructed to output the pixel displacement vectors obtained through the alignment processing to the local movement image generation means 101, which is different from the image interpretation aiding apparatus A.

The cumulative warped image generation means 1 generates the final warped images corresponding to the maximal inhalation image and the maximal exhalation image, in the same manner as the image interpretation aiding apparatus A, and outputs the vectors ($\Delta x, \Delta y$) obtained at the step #7.7 in the alignment processing as the pixel displacement vectors to the local movement image generation means 101.

The local movement image generation means 101 carries out the following procedure for a natural number n ranging from 1 to (N−1). The local movement image generation means 101 divides an image n into local areas each having approximately 30 to 50 pixels in horizontal and vertical directions (assuming that the images being processed are standard density images wherein one pixel size is 0.2 mm). This division is carried out for observation of local respiratory function of a 6~10 mm tissue called a secondary lobe comprising alveoli. The local movement image generation means 101 then finds the local displacement vector representing a displacement of each of the local areas, by composition of the corresponding pixel displacement vectors generated through the alignment processing between a warped image n and an image (n+1). The warped image n refers to the image 1 if n=1, and refers to an image generated by the alignment processing between a warped image (n−1)

and the image n in the case where n≧2. The local movement image generation means 101 generates the local movement image wherein the direction and the magnitude of the local displacement vector are expressed at the center of a corresponding one of the local areas in the image n.

Figure 21:
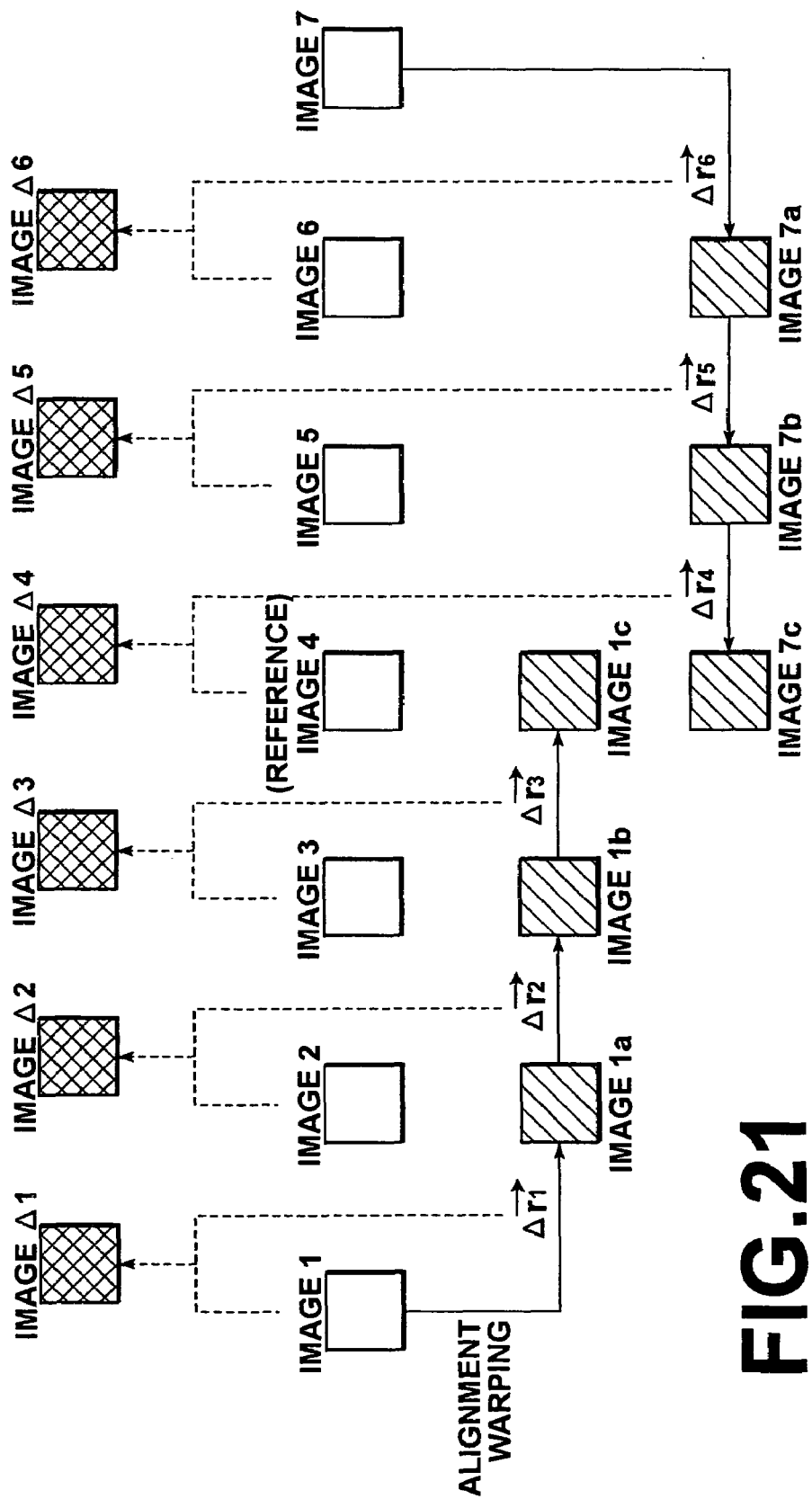
FIG. 21 shows a procedure carried out in the cumulative warped image generation means 1 and local movement image generation means 101 in the sixth embodiment.

FIG. 21 is a diagram showing the procedure carried out by the cumulative warped image generation means 1 and the local movement image generation means 101 in the case where the number of the images is 7 and an image 4 is used as the reference image. As shown in FIG. 21, the cumulative warped image generation means 1 carries out the alignment processing between images 1 and 2, and generates a warped image 1a. At the same time, the cumulative warped image generation means 1 obtains pixel displacement vectors Δr1. The cumulative warped image generation means 1 then carries out the alignment processing between the warped image 1a and an image 3, and obtains a warped image 1b and pixel displacement vectors Δr2. Likewise, the cumulative warped image generation means 1 also obtains a warped image 1c and pixel displacement vectors Δr3. The cumulative warped image generation means 1 further obtains a warped image 7a and pixel displacement vectors Δr6 through the alignment processing between an image 7 and an image 6, and obtains a warped image 7b and pixel displacement vectors Δr5 through the alignment processing on the warped image 7a and an image 5. Likewise, the cumulative warped image generation means 1 obtains a warped image 7c and pixel displacement vectors Δr4. The local movement image generation means 101 generates a local movement image Δ1 based on the image 1 and the pixel displacement vectors Δr1. Likewise, the local movement image generation means 101 generates local movement images Δ2 and Δ3. The local movement image generation means 101 further generates a local movement image Δ4. At this time, the local movement image generation means 101 reverses the direction of the displacement vectors Δr4, since the displacement vectors Δr4 to Δr6 have been obtained through the alignment processing from the image 7 to the image 4 and thus have the reverse direction to the displacement vectors Δr1 to Δr3. Local movement images Δ5 and Δ6 are also generated in the same manner as the local movement image Δ4.

Figure 22:
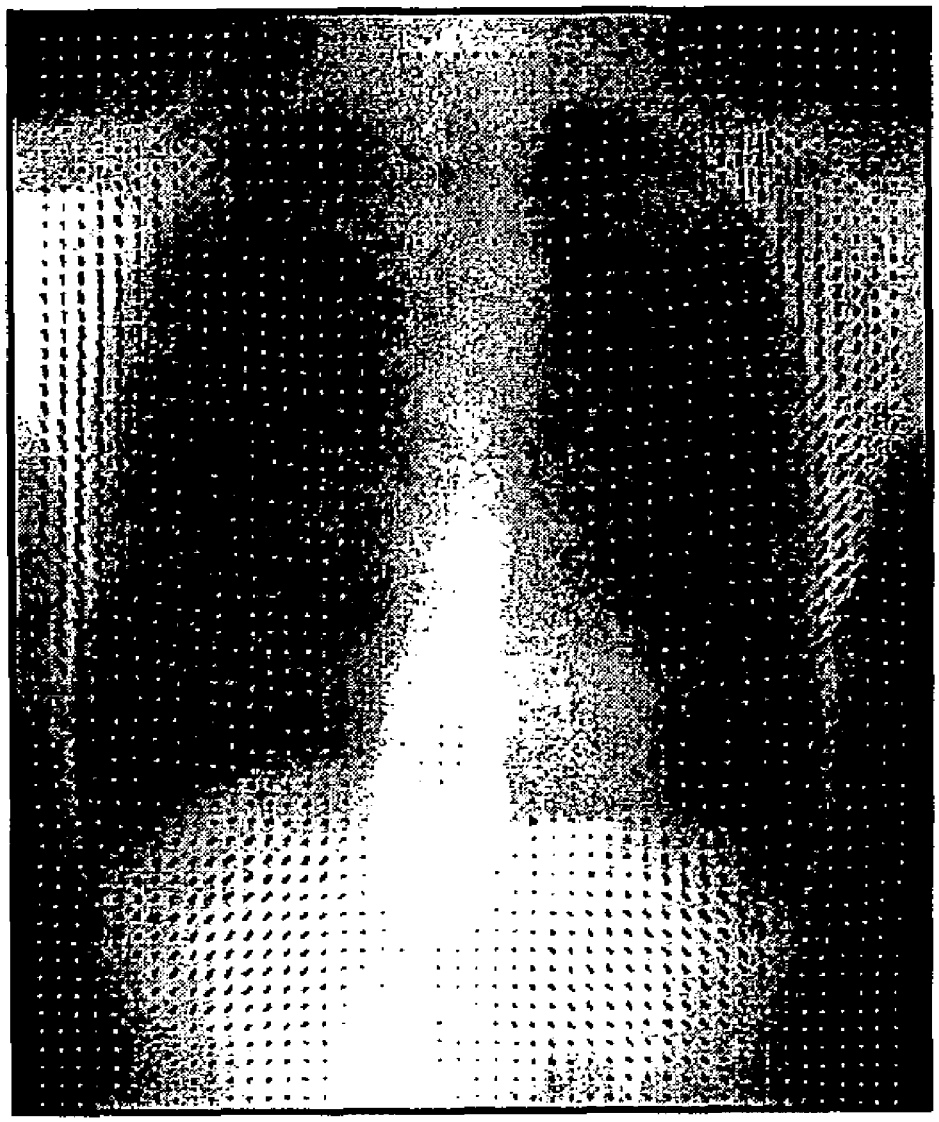
FIG. 22 shows an example of a local movement image.

The image display means 3 displays the two final warped images representing the maximal exhalation state and the maximal inhalation state, and also displays the local movement images in the form of a moving image by serially changing the local movement images generated by the local movement image generation means 101 in order of the change in the respiratory state (from the maximal exhalation state to the maximal inhalation state) at predetermined intervals. The moving image is also provided for observation of the local respiratory function. FIG. 22 shows an example of one of the local movement images.

As has been described above, according to the image interpretation aiding apparatus F in the sixth embodiment of the present invention, the local movement image generation means 101 generates the local movement images representing the displacement of the local areas, based on the pixel displacement vectors representing the direction and the magnitude of the movements of the pixels through the alignment processing carried out by the cumulative warped image generation means 1. Therefore, the subject can be observed with respect to the direction and the magnitude of the movements of the local areas. Since the direction and the magnitude of the movements of the local areas are less affected by noise than the density change to be observed in the embodiments described above, reduction in diagnostic efficiency and accuracy can be prevented.

Figure 23:
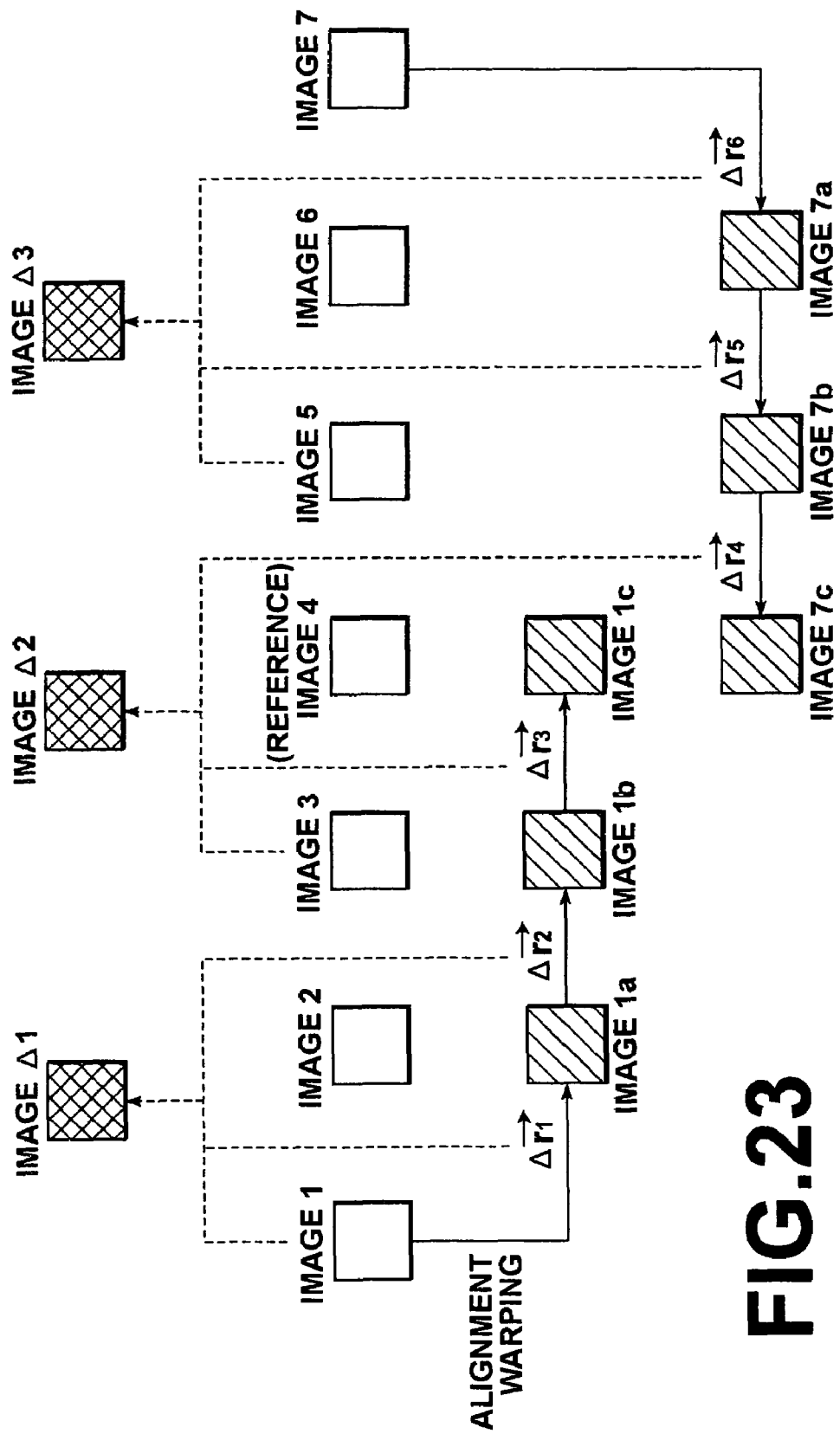
FIG. 23 shows a procedure carried out in the cumulative warped image generation means 1 and the local movement image generation means 101 in a modification to the sixth embodiment of the present invention.
Figure 24:
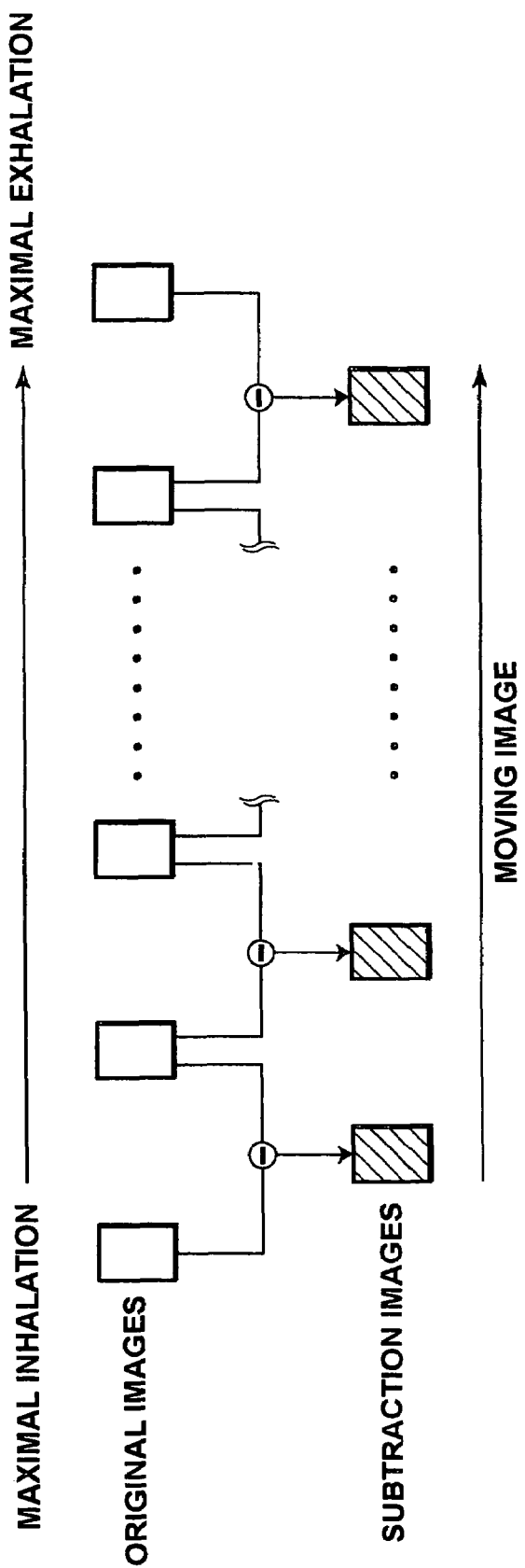
FIG. 24 shows how a moving subtraction image is generated from a difference between images adjacent to each other in a moving image representing a plurality of phases of respiratory cycle according to a conventional method.

The local movement image generation means 101 may generate a local movement image between images that are not adjacent to each other. FIG. 23 shows the case where a local movement image is generated between alternate images. As shown in FIG. 23, a local movement image Δ1 is generated, for example, based on an image 1, displacement vectors Δr2 obtained through the alignment processing between an image 3 and a warped image 1a generated by the alignment processing between the image 1 and an image 2, and displacement vectors Δr1 generated by the alignment processing between the images 1 and 2. More specifically, a local displacement vector is found for each of the local areas by adding the displacement vectors Δr1 and Δr2 for the corresponding pixels and by adding the resulting vectors therein. The local displacement vectors for all the local areas are displayed in superposition on the image 1. Local movement images Δ2 and Δ3 are also generated in the same manner.

In addition, there are cases, in which the local areas that the local movement image generation means 101 divides the images into, are segmented in the same manner as the templates ROI(T) of step #7.6 during each local matching process, as illustrated in FIG. 7. In these cases, it is not necessary to derive local displacement vectors by synthesizing displacement vectors for each pixel. Instead, the shift vectors (Δx, Δy) of the central pixels (x, y) of each ROI of step #7.6 can be designated as the local displacement vector. In this manner, the processing becomes more efficient.

In the description above, the local displacement vectors are displayed in superposition on the image before the displacement caused by the alignment processing (that is, on an original image). However, the image on which the local displacement vectors are displayed may be an image after the displacement or a warped image before or after the displacement. For example, in FIG. 21, the local movement image Δ2 is generated by superposition of the local displacement vectors found according to the displacement vectors Δr2 on the original image 2. However, instead of the image 2, the image used for superposition may be the warped image 1a as a warped image before the displacement or the original image 3. Alternatively, the image may be the warped image 1b as a warped image after the displacement.

Furthermore, if an area of rib cage is detected according to the rib cage detection processing described above, the local displacement vectors to be displayed may have different colors between the inside and the outside of the rib cage.

The image display means 3 may arrange and display the local movement images in one screen.

The local movement images can also be generated by using pixel displacement vectors obtained by the alignment processing between two images adjacent to each other among three or more images arranged in order of state change in a subject.

In the above embodiments, the case has been described where the maximal inhalation image is compared with the maximal exhalation image among the chest radiographs obtained by photography of the different phases of respiratory cycle. However, the images to be aligned are not necessarily limited to the images described above, and any two or more images representing a change in a state of a subject and not adjacent to each other in three or more images arranged in temporal order can be used as long as the alignment processing can be carried thereon.

What is claimed is:

1. An image interpretation aiding method for aiding comparative image reading the image interpretation aiding method comprising the steps of:

reading between two observation images that are not adjacent to each other in three or more images arranged in temporal order representing a change in a state of a subject;

determining which one of the three or more images used as a reference image;

generating a first aligned image n by transforming a position of the subject in one of the observation images through alignment processing for aligning the subject in the observation image to the subject in a first transitional image that is adjacent to the observation image and located between the observation image and the reference image;

repeating generation of an (n+1)th aligned image where n is a natural number starting from 1 by transforming a position of the subject in an nth aligned image through alignment processing for aligning the subject in the nth aligned image to the subject in an (n+1)th transitional image that is adjacent to an nth transitional image and located between the nth transitional image and the reference image, until the reference image becomes the (n+1)th transitional image;

generating a second aligned image from the other observation image in the same manner and for repeating generation of an (n+1)th aligned image from an nth aligned image in the same manner until the reference image becomes an (n+1) th transitional image; whereby two final aligned images are generated having the subject in the two observation images aligned to the subject in the reference image.

2. An image interpretation aiding method for aiding comparative image reading the image interpretation aiding method comprising the steps of:

reading between two observation images that are not adjacent to each other in three or more images arranged in temporal order representing a change in a state of a subject;

determining which one of the three or more images used as a reference image;

generating first alignment result information n by carrying out alignment processing for aligning the subject included in one of the two observation images to the subject in a first transitional image adjacent to the observation image and located between the observation image and the reference image;

repeating generation of (n+1)th alignment result information where n is a natural number starting from 1 by carrying out alignment processing for aligning the subject in the observation image whose position is transformed according to the first alignment result information to nth alignment result information to the subject in an (n+1)th transitional image that is adjacent to an nth transitional image and located between the nth transitional image and the reference image, until the reference image becomes the (n+1)th transitional image;

generating second alignment result information from the other observation image in the same manner, and repeating generation of (n+1)th alignment result information from the other observation image in the same manner until the reference image becomes an (n+1)th transitional image; and generating two final aligned images by respectively aligning the subject in the two observation images to the subject in the reference image through transformation of the position of the subject in the respective observation images based on all the alignment result information generated for the corresponding observation images.

3. An image interpretation aiding method according to claim 1, further comprising the step of generating a final subtraction image based on a difference between the two final aligned images.

4. An image interpretation aiding method according to claim 2, further comprising the step of generating a final subtraction image based on a difference between the two final aligned images.

5. An image interpretation aiding method according to claim 3, further comprising the steps of:

classifying pixel values in the final subtraction image into two or more segments according to one or more threshold values; and generating a final map image enabling recognition of the segments in the final subtraction image.

6. An image interpretation aiding method according to claim 4, further comprising the steps of:

classifying pixel values in the final subtraction image into two or more segments according to one or more threshold values; and generating a final map image enabling recognition of the segments in the final subtraction image.

7. An image interpretation aiding method according to claim 1, further comprising the steps of:

generating a final aligned image or final aligned images by aligning the subject in at least one of the transitional images located between either one of the observation images and the reference image to the subject in the reference image in the same manner as the observation images; and generating subtraction images based on a difference between one of the two final aligned images generated from one of the observation images and the final aligned images generated from the other observation image and the transitional image or images.

8. An image interpretation aiding method according to claim 2, further comprising the steps of:

generating a final aligned image or final aligned images by aligning the subject in at least one of the transitional images located between either one of the observation images and the reference image to the subject in the reference image in the same manner as the observation images; and generating subtraction images based on a difference between one of the two final aligned images generated from one of the observation images and the final aligned images generated from the other observation image and the transitional image or images.

9. An image interpretation aiding method according to claim 7, further comprising the steps of:

classifying pixel values in the subtraction images into two or more segments according to one or more threshold values; and generating map images enabling recognition of the segments in the respective subtraction images.

10. An image interpretation aiding method according to claim 8, further comprising the steps of:

classifying pixel values in the subtraction images into two or more segments according to one or more threshold values; and generating map images enabling recognition of the segments in the respective subtraction images.

11. An image interpretation aiding method according to claim 1, the alignment processing comprising the steps of finding correspondence between pixel positions in the two images being processed by paying attention to the position of the subject in the two images and finding direction and magnitude of movement of each of pixels in one of the two images to the other one of the two images, the image interpretation aiding method further comprising the steps of:

dividing one of the two images into local areas each of which has a predetermined number of pixels;

finding direction and/or magnitude of movement of each of the local areas according to the direction and the magnitude of the movement of each of the pixels; and generating a local movement image representing the direction and/or the magnitude of the movement of each of the local areas in relation to a position thereof.

12. An image interpretation aiding method according to claim 2, the alignment processing comprising the steps of finding correspondence between pixel positions in the two images being processed by paying attention to the position of the subject in the two images and finding direction and magnitude of movement of each of pixels in one of the two images to the other one of the two images, the image interpretation aiding method further comprising the steps of:

dividing one of the two images into local areas each of which has a predetermined number of pixels;

finding direction and/or magnitude of movement of each of the local areas according to the direction and the magnitude of the movement of each of the pixels; and generating a local movement image representing the direction and/or the magnitude of the movement of each of the local areas in relation to a position thereof.

13. An image interpretation aiding method according to claim 1, the alignment processing comprising the steps of finding correspondence between pixel positions in the two images being processed by paying attention to the position of the subject in the two images and finding direction and magnitude of movement of each of pixels in one of the two images to the other one of the two images, the image interpretation aiding method further comprising the steps of:

finding direction and magnitude of movement of each of pixels in two of the three or more images that are not adjacent to each other when arranged in the order of the change in the state of the subject, through vector composition of the direction and the magnitude of the movement of each of the pixels found through the alignment processing carried out on the images located between the two of the images;

dividing one of the two of the images into local areas each of which has a predetermined number of pixels;

finding direction and/or magnitude of movement of each of the local areas between the two of the images according to the direction and the magnitude of the movement of each of the pixels in the two of the images; and generating a local movement image representing the direction and/or the magnitude of the movement of each of the local areas in relation to a position thereof.

14. An image interpretation aiding method according to claim 2, the alignment processing comprising the steps of finding correspondence between pixel positions in the two images being processed by paying attention to the position of the subject in the two images and finding direction and magnitude of movement of each of pixels in one of the two images to the other one of the two images, the image interpretation aiding method further comprising the steps of:

finding direction and magnitude of movement of each of pixels in two of the three or more images that are not adjacent to each other when arranged in the order of the change in the state of the subject, through vector composition of the direction and the magnitude of the movement of each of the pixels found through the alignment processing carried out on the images located between the two of the images;

dividing one of the two of the images into local areas each of which has a predetermined number of pixels;

finding direction and/or magnitude of movement of each of the local areas between the two of the images according to the direction and the magnitude of the movement of each of the pixels in the two of the images; and generating a local movement image representing the direction and/or the magnitude of the movement of each of the local areas in relation to a position thereof.

15. An image interpretation aiding method according to claim 1, the subject including at least bones and soft tissue, the three or more images being medical radiographs, the image interpretation aiding method further comprising the steps of:

generating soft-tissue images including the soft tissue alone from the three or more medical radiographs representing the change in the state of the subject; and carry out the alignment processing by using the soft-tissue images as the three or more images to be subjected to the alignment processing.

16. An image interpretation aiding method according to claim 2, the subject including at least bones and soft tissue, the three or more images being medical radiographs, the image interpretation aiding method further comprising the steps of:

generating soft-tissue images including the soft tissue alone from the three or more medical radiographs representing the change in the state of the subject; and carry out the alignment processing by using the soft-tissue images as the three or more images to be subjected to the alignment processing.

17. An image interpretation aiding method according to claim 1, wherein the alignment processing is a combination of global matching carrying out linear transformation and local matching carrying out non-linear transformation.

18. An image interpretation aiding method according to claim 2, wherein the alignment processing is a combination of global matching carrying out linear transformation and local matching carrying out non-linear transformation.

19. An image interpretation aiding apparatus for aiding comparative image reading the image interpretation aiding apparatus comprising:

means for reading between two observation images that are not adjacent to each other in three or more images arranged in temporal order representing a change in a state of a subject;

cumulative aligned image generation means for determining which one of the three or more images used as a reference image;

for generating a second aligned image by transforming a position of the subject in one of the observation images through alignment processing for aligning the subject in the observation image to the subject in a first transitional image that is adjacent to the observation image and located between the observation image and the reference image, for repeating generation of an (n+1)th aligned image where n is a natural number starting from 1 by transforming a position of the subject in an nth aligned image through alignment processing for aligning the subject in the nth aligned image to the subject in an (n+1)th transitional image that is adjacent to an nth transitional image and located between the nth transitional image and the reference image until the reference image becomes the (n+1)th transitional image, for generating a first aligned image from the other observation image in the same manner and for repeating generation of an (n+1)th aligned image from an nth aligned image in the same manner until the reference image becomes an (n+1)th transitional image, whereby the cumulative aligned image generation means generates two final aligned images having the subject in the two observation images aligned to the subject in the reference image.

20. An image interpretation aiding apparatus for aiding comparative image reading the image interpretation aiding apparatus comprising:

means for reading between two observation images that are not adjacent to each other in three or more images arranged in temporal order representing a change in a state of a subject;

cumulative alignment information generation means for determining which one of the three or more images used as a reference image, for generating first alignment result information n by carrying out alignment processing for aligning the subject included in one of the two observation images to the subject in a first transitional image adjacent to the observation image and located between the observation image and the reference image;

for repeating generation of (n+1)th alignment result information where n is a natural number starting from 1 by carrying out alignment processing for aligning the subject in the observation image whose position is transformed according to the first alignment result information to nth alignment result information to the subject in an (n+1)th transitional image that is adjacent to an nth transitional image and located between the nth transitional image and the reference image until the reference image becomes the (n+1)th transitional image, for generating second alignment result information from the other observation image in the same manner, and for repeating generation of (n+1)th alignment result information from the other observation image in the same manner until the reference image becomes an (n+1)th transitional image, and final aligned image generation means for generating two final aligned images by respectively aligning the subject in the two observation images to the subject in the reference image through transformation of the position of the subject in the respective observation images based on all the alignment result information generated for the corresponding observation images.

21. An image interpretation aiding apparatus according to claim 19, further comprising final subtraction image generation means for generating a final subtraction image based on a difference between the two final aligned images.

22. An image interpretation aiding apparatus according to claim 20, further comprising final subtraction image generation means for generating a final subtraction image based on a difference between the two final aligned images.

23. An image interpretation aiding apparatus according to claim 21, further comprising final map image generation means for classifying pixel values in the final subtraction image into two or more segments according to one or more threshold values and for generating a final map image enabling recognition of the segments in the final subtraction image.

24. An image interpretation aiding apparatus according to claim 22, further comprising final map image generation means for classifying pixel values in the final subtraction image into two or more segments according to one or more threshold values and for generating a final map image enabling recognition of the segments in the final subtraction image.

25. An image interpretation aiding apparatus according to claim 19, the cumulative aligned image generation means generating a final aligned image or final aligned images by aligning the subject in at least one of the transitional images located between either one of the observation images and the reference image to the subject in the reference image in the same manner as the observation images, the image interpretation aiding apparatus further comprising:

means for generating subtraction images based on a difference between one of the two final aligned images generated from one of the two observation images and the final aligned images generated from the other observation image and the transitional image or images.

26. An image interpretation aiding apparatus according to claim 20, the cumulative alignment information generation means generating the (n+1)th alignment result by carrying out the alignment processing for aligning the subject in at least one of the transitional images located between either one of the observation images and the reference image to the subject in the reference image in the same manner as the observation images, the final aligned image generation means generating a final aligned image or final aligned images according to the corresponding alignment result information for the transitional image or images, the image interpretation aiding apparatus further comprising:

means for generating subtraction images based on a difference between one of the two final aligned images generated from one of the two observation images and the final aligned images generated from the other observation image and the transitional image or images.

27. An image interpretation aiding apparatus according to claim 25, further comprising final map image generation means for classifying pixel values in the subtraction images into two or more segments according to one or more threshold values and for generating map images enabling recognition of the segments in the respective subtraction images.

28. An image interpretation aiding apparatus according to claim 26, further comprising final map image generation means for classifying pixel values in the subtraction images into two or more segments according to one or more threshold values and for generating map images enabling recognition of the segments in the respective subtraction images.

29. An image interpretation aiding apparatus according to claim 19, the alignment processing comprising the steps of finding correspondence between pixel positions in the two images being processed by paying attention to the position of the subject in the two images and finding direction and magnitude of movement of each of pixels in one of the two images to the other one of the two images, the image interpretation aiding apparatus further comprising local movement image generation means for dividing one of the two images into local areas each of which has a predetermined number of pixels, for finding direction and/or magnitude of movement of each of the local areas according to the direction and the magnitude of the movement of each of the pixels, and for generating a local movement image representing the direction and/or the magnitude of the movement of each of the local areas in relation to a position thereof.

30. An image interpretation aiding apparatus according to claim 20, the alignment processing comprising the steps of finding correspondence between pixel positions in the two images being processed by paying attention to the position of the subject in the two images and finding direction and magnitude of movement of each of pixels in one of the two images to the other one of the two images, the image interpretation aiding apparatus further comprising local movement image generation means for dividing one of the two images into local areas each of which has a predetermined number of pixels, for finding direction and/or magnitude of movement of each of the local areas according to the direction and the magnitude of the movement of each of the pixels, and for generating a local movement image representing the direction and/or the magnitude of the movement of each of the local areas in relation to a position thereof.

31. An image interpretation aiding apparatus according to claim 19, the alignment processing comprising the steps of finding correspondence between pixel positions in the two images being processed by paying attention to the position of the subject in the two images and finding direction and magnitude of movement of each of pixels in one of the two images to the other one of the two images, the image interpretation aiding apparatus further comprising local movement image generation means for finding direction and magnitude of movement of each of pixels in two of the three or more images that are not adjacent to each other when arranged in the order of the change in the state of the subject through vector composition of the direction and the magnitude of the movement of each of the pixels found through the alignment processing on the images located between the two of the images, for dividing one of the two of the images into local areas each of which has a predetermined number of pixels, for finding direction and/or magnitude of movement of each of the local areas between the two of the images according to the direction and the magnitude of the movement of each of the pixels in the two of the images, and for generating a local movement image representing the direction and/or the magnitude of the movement of each of the local areas in relation to a position thereof.

32. An image interpretation aiding apparatus according to claim 20, the alignment processing comprising the steps of finding correspondence between pixel positions in the two images being processed by paying attention to the position of the subject in the two images and finding direction and magnitude of movement of each of pixels in one of the two images to the other one of the two images, the image interpretation aiding apparatus further comprising local movement image generation means for finding direction and magnitude of movement of each of pixels in two of the three or more images that are not adjacent to each other when arranged in the order of the change in the state of the subject through vector composition of the direction and the magnitude of the movement of each of the pixels found through the alignment processing on the images located between the two of the images, for dividing one of the two of the images into local areas each of which has a predetermined number of pixels, for finding direction and/or magnitude of movement of each of the local areas between the two of the images according to the direction and the magnitude of the movement of each of the pixels in the two of the images, and for generating a local movement image representing the direction and/or the magnitude of the movement of each of the local areas in relation to a position thereof.

33. An image interpretation aiding apparatus according to claim 19, the subject including at least bones and soft tissue, the image interpretation aiding apparatus further comprising soft-tissue image generation means for generating soft-tissue images including the soft tissue alone from three or more medical radiographs representing the change in the state of the subject, and the alignment processing being carried out by using the soft-tissue images as the three or more images subjected to the alignment processing.

34. An image interpretation aiding apparatus according to claim 20, the subject including at least bones and soft tissue, the image interpretation aiding apparatus further comprising soft-tissue image generation means for generating soft-tissue images including the soft tissue alone from three or more medical radiographs representing the change in the state of the subject, and the alignment processing being carried out by using the soft-tissue images as the three or more images subjected to the alignment processing.

35. An image interpretation aiding apparatus according to claim 19, wherein the three or more images representing the change in the state of the subject are medical radiographs of human chest obtained by photography of a plurality of respiratory states.

36. An image interpretation aiding apparatus according to claim 20, wherein the three or more images representing the change in the state of the subject are medical radiographs of human chest obtained by photography of a plurality of respiratory states.

37. An image interpretation aiding apparatus according to claim 35, wherein the two observation images are a maximal inhalation image and a maximal exhalation image.

38. An image interpretation aiding apparatus according to claim 36, wherein the two observation images are a maximal inhalation image and a maximal exhalation image.

39. An image interpretation aiding apparatus according to claim 19, wherein the alignment processing is a combination of global matching carrying out linear transformation and local matching carrying out non-linear transformation.

40. An image interpretation aiding apparatus according to claim 20, wherein the alignment processing is a combination of global matching carrying out linear transformation and local matching carrying out non-linear transformation.

41. A computer-readable recording medium storing an image interpretation aiding program for causing a computer to have a function of aiding comparative image reading between two observation images that are not adjacent to each other in three or more images arranged in temporal order representing a change in a state of a subject, the image interpretation aiding program causing the computer to function as;

cumulative aligned image generation means for determining which one of the three or more images used as a reference image, for generating a first aligned image n by transforming a position of the subject in one of the observation images through alignment processing for aligning the subject in the observation image to the subject in a first transitional image that is adjacent to the observation image and located between the observation image and the reference image, for repeating generation of an (n+1)th aligned image where n is a natural number starting from 1 by transforming a position of the subject in an nth aligned image through alignment processing for aligning the subject in the nth aligned image to the subject in an (n+1)th transitional image that is adjacent to an nth transitional image and located between the nth transitional image and the reference image until the reference image becomes the (n+1)th transitional image, for generating a second aligned image from the other observation image in the same manner and for repeating generation of an (n+1)th aligned image from an nth aligned image in the same manner until the reference image becomes an (n+1)th transitional image, whereby two final aligned images are generated having the subject in the two observation images aligned to the subject in the reference image.

42. A computer-readable recording medium storing an image interpretation aiding program for causing a computer to have a function of aiding comparative image reading between two observation images that are not adjacent to each other in three or more images arranged in temporal order representing a change in a state of a subject, the image interpretation aiding program causing the computer to function as cumulative alignment information generation means for determining which one of the three or more images used as a reference image, for generating first alignment result information n by carrying out alignment processing for aligning the subject included in one of the two observation images to the subject in a first transitional image adjacent to the observation image and located between the observation image and the reference image, for repeating generation of (n+1)th alignment result information where n is a natural number starting from 1 by carrying out alignment processing for aligning the subject in the observation image whose position is transformed according to the first alignment result information to nth alignment result information to the subject in an (n+1)th transitional image that is adjacent to an nth transitional image and located between the nth transitional image and the reference image until the reference image becomes the (n+1)th transitional image, for generating second alignment result information from the other observation image in the same manner, and for repeating generation of (n+1) th alignment result information from the other observation image in the same manner until the reference image becomes an (n+1)th transitional image, the image interpretation aiding program also causing the computer to function as final aligned image generation means for generating two final aligned images by respectively aligning the subject in the two observation images to the subject in the reference image through transformation of the position of the subject in the respective observation images based on all the alignment result information generated for the corresponding observation images.

43. A computer-readable recording medium storing the image interpretation aiding program according to claim 41, the image interpretation aiding program further causing the computer to function as final subtraction image generation means for generating a final subtraction image according to a difference between the two final aligned images.

44. A computer-readable recording medium storing the image interpretation aiding program according to claim 42, the image interpretation aiding program further causing the computer to function as final subtraction image generation means for generating a final subtraction image according to a difference between the two final aligned images.

45. A computer-readable recording medium storing the image interpretation aiding program according to claim 43, the image interpretation aiding program further causing the computer to function as final map image generation means for classifying pixel values in the final subtraction image into two or more segments according to one or more threshold values and for generating a final map image enabling recognition of the segments in the final subtraction image.

46. A computer-readable recording medium storing the image interpretation aiding program according to claim 44, the image interpretation aiding program further causing the computer to function as final map image generation means for classifying pixel values in the final subtraction image into two or more segments according to one or more threshold values and for generating a final map image enabling recognition of the segments in the final subtraction image.

47. A computer-readable recording medium storing the image interpretation aiding program according to claim 41, the image interpretation aiding program causing the computer to function in order to cause the cumulative aligned image generation means to generate a final aligned image or final aligned images by aligning the subject in at least one of the transitional images located between either one of the observation images and the reference image to the subject in the reference image in the same manner as the observation images, and causing the computer to further function as means for generating subtraction images based on a difference between one of the two final aligned images generated from one of the observation images and the final aligned images generated from the other observation image and the transitional image or images.

48. A computer-readable recording medium storing the image interpretation aiding program according to claim 42, the image interpretation aiding program causing the computer to function in order to cause the cumulative aligned image generation means to generate a final aligned image or final aligned images by aligning the subject in at least one of the transitional images located between either one of the observation images and the reference image to the subject in the reference image in the same manner as the observation images, and causing the computer to further function as means for generating subtraction images based on a difference between one of the two final aligned images generated from one of the observation images and the final aligned images generated from the other observation image and the transitional image or images.

49. A computer-readable recording medium storing the image interpretation aiding program according to claim 47, the image interpretation aiding program further causing the computer to function as means for classifying pixel values in the respective subtraction images into two or more segments according to one or more threshold values and for generating map images enabling recognition of the segments in the corresponding subtraction images.

50. A computer-readable recording medium storing the image interpretation aiding program according to claim 48, the image interpretation aiding program further causing the computer to function as means for classifying pixel values in the respective subtraction images into two or more segments according to one or more threshold values and for generating map images enabling recognition of the segments in the corresponding subtraction images.

51. A computer-readable recording medium storing the image interpretation aiding program according to claim 41, the alignment processing comprising the steps of finding correspondence between pixel positions in the two images being processed by paying attention to the position of the subject in the two images and finding direction and magnitude of movement of each of pixels in one of the two images to the other one of the two images, the image interpretation aiding program further causing the computer to function as
 means for dividing one of the two images into local areas each of which has a predetermined number of pixels,
 for finding direction and/or magnitude of movement of each of the local areas according to the direction and the magnitude of the movement of each of the pixels, and
 for generating a local movement image representing the direction and/or the magnitude of the movement of each of the local areas in relation to a position thereof.

52. A computer-readable recording medium storing the image interpretation aiding program according to claim 42, the alignment processing comprising the steps of finding correspondence between pixel positions in the two images being processed by paying attention to the position of the subject in the two images and finding direction and magnitude of movement of each of pixels in one of the two images to the other one of the two images, the image interpretation aiding program further causing the computer to function as
 means for dividing one of the two images into local areas each of which has a predetermined number of pixels,
 for finding direction and/or magnitude of movement of each of the local areas according to the direction and the magnitude of the movement of each of the pixels, and
 for generating a local movement image representing the direction and/or the magnitude of the movement of each of the local areas in relation to a position thereof.

53. A computer-readable recording medium storing the image interpretation aiding program according to claim 41, the alignment processing comprising the steps of finding correspondence between pixel positions in the two images being processed by paying attention to the position of the subject in the two images and finding direction and magnitude of movement of each of pixels in one of the two images to the other one of the two images, the image interpretation aiding program further causing the computer to function as
 means for finding direction and magnitude of movement of each of pixels in two of the three or more images that are not adjacent to each other when arranged in the order of the change in the state of the subject through vector composition of the direction and the magnitude of the movement of each of the pixels found through the alignment processing on the images located between the two of the images,
 for dividing one of the two of the images into local areas each of which has a predetermined number of pixels,
 for finding direction and/or magnitude of movement of each of the local areas between the two of the images according to the direction and the magnitude of the movement of each of the pixels in the two of the images, and
 for generating a local movement image representing the direction and/or the magnitude of the movement of each of the local areas in relation to a position thereof.

54. A computer-readable recording medium storing the image interpretation aiding program according to claim 42, the alignment processing comprising the steps of finding correspondence between pixel positions in the two images being processed by paying attention to the position of the subject in the two images and finding direction and magnitude of movement of each of pixels in one of the two images to the other one of the two images, the image interpretation aiding program further causing the computer to function as
 means for finding direction and magnitude of movement of each of pixels in two of the three or more images that are not adjacent to each other when arranged in the order of the change in the state of the subject through vector composition of the direction and the magnitude of the movement of each of the pixels found through the alignment processing on the images located between the two of the images,
 for dividing one of the two of the images into local areas each of which has a predetermined number of pixels,
 for finding direction and/or magnitude of movement of each of the local areas between the two of the images according to the direction and the magnitude of the movement of each of the pixels in the two of the images, and
 for generating a local movement image representing the direction and/or the magnitude of the movement of each of the local areas in relation to a position thereof.

55. A computer-readable recording medium storing the image interpretation aiding program according to claim 41, the subject including at least bones and soft tissue, the image interpretation aiding program further causing the computer to function as
 soft-tissue image generation means for generating soft-tissue images including the soft tissue alone from three or more medical radiographs representing the change in the state of the subject, and causing the computer to function in order to carry out the alignment processing by using the soft-tissue images as the three or more images subjected to the alignment processing.

56. A computer-readable recording medium storing the image interpretation aiding program according to claim 42, the subject including at least bones and soft tissue, the image interpretation aiding program further causing the computer to function as
 soft-tissue image generation means for generating soft-tissue images including the soft tissue alone from three or more medical radiographs representing the change in the state of the subject, and causing the computer to function in order to carry out the alignment processing by using the soft-tissue images as the three or more images subjected to the alignment processing.

57. A computer-readable recording medium storing the image interpretation aiding program according to claim 41, wherein the alignment processing is a combination of global matching carrying out linear transformation and local matching carrying out non-linear transformation.

58. A computer-readable recording medium storing the image interpretation aiding program according to claim 42, wherein the alignment processing is a combination of global matching carrying out linear transformation and local matching carrying out non-linear transformation.

* * * * *